US012754010B2

(12) United States Patent
Kumagai et al.

(10) Patent No.: US 12,754,010 B2
(45) Date of Patent: Oct. 6, 2026

(54) METHOD FOR ESTIMATING FLANGE DISPLACEMENT AMOUNT IN ROTARY MACHINE, PROGRAM FOR EXECUTING METHOD, AND DEVICE FOR PERFORMING METHOD

(71) Applicant: MITSUBISHI HEAVY INDUSTRIES, LTD., Tokyo (JP)

(72) Inventors: Satoshi Kumagai, Tokyo (JP); Shunsuke Mizumi, Tokyo (JP); Koji Ishibashi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 302 days.

(21) Appl. No.: 18/578,629

(22) PCT Filed: Nov. 30, 2022

(86) PCT No.: PCT/JP2022/044213
§ 371 (c)(1),
(2) Date: Jan. 11, 2024

(87) PCT Pub. No.: WO2023/162388
PCT Pub. Date: Aug. 31, 2023

(65) Prior Publication Data

US 2024/0328773 A1 Oct. 3, 2024

(30) Foreign Application Priority Data

Feb. 25, 2022 (JP) ................................ 2022-027443

(51) Int. Cl.
*G01B 11/00* (2006.01)

(52) U.S. Cl.
CPC ................................ *G01B 11/005* (2013.01)

(58) Field of Classification Search
CPC ....... G01B 11/005; G01B 21/04; F01D 25/24; F01D 25/243; F01D 21/003; F05D 2220/31; F05D 2260/31
(Continued)

(56) References Cited

U.S. PATENT DOCUMENTS 5,031,314 A 7/1991 Berrong et al.
6,257,829 B1 * 7/2001 Seeley .................... F01D 25/00 415/213.1

(Continued)

FOREIGN PATENT DOCUMENTS

DE 11 2020 007 537 6/2023
JP 2018-178960 11/2018

(Continued)

OTHER PUBLICATIONS

International Search Report issued Feb. 7, 2023 in International (PCT) Application No. PCT/JP2022/044213.

*Primary Examiner* — Marrit Eyassu
(74) *Attorney, Agent, or Firm* — Wenderoth, Lind & Ponack, L.L.P.

(57) ABSTRACT

A method for estimating a flange displacement amount includes determining effective three-dimensional coordinate data at a lower first position of a first supported portion on a surface continuous with a lower flange surface and at an upper first position coincident with the lower first position in a horizontal direction on a surface continuous with an upper flange surface. The effective three-dimensional coordinate data are changed such that the effective three-dimensional coordinate data at the lower first position and the effective three-dimensional coordinate data at the upper first position are coincident with each other. According to a difference between a position in a vertical direction indicated by the effective three-dimensional coordinate data at an upper target position and a position in the vertical direction indi- (Continued)

cated by the effective three-dimensional coordinate data at a lower target position, displacement amounts of the upper target position and the lower target position are obtained.

17 Claims, 24 Drawing Sheets

(58) Field of Classification Search
USPC ........................................................ 73/660
See application file for complete search history.

(56) References Cited

U.S. PATENT DOCUMENTS

| | | | |
|---|---|---|---|
| 2003/0176949 | A1 | 9/2003 | Steingraeber |
| 2018/0142571 | A1 | 5/2018 | Mizumi et al. |
| 2018/0307205 | A1* | 10/2018 | Yashirodai ......... G05B 19/4097 |
| 2019/0107007 | A1* | 4/2019 | Yashirodai ............ F01D 21/003 |
| 2023/0097598 | A1 | 3/2023 | Kumagai et al. |

FOREIGN PATENT DOCUMENTS

| | | |
|---|---|---|
| JP | 2019-70334 | 5/2019 |
| JP | 6523771 | 5/2019 |
| JP | 2022-37334 | 3/2022 |
| WO | 2021/086208 | 5/2021 |

* cited by examiner

METHOD FOR ESTIMATING FLANGE DISPLACEMENT AMOUNT IN ROTARY MACHINE, PROGRAM FOR EXECUTING METHOD, AND DEVICE FOR PERFORMING METHOD

TECHNICAL FIELD

The present disclosure relates to a method for estimating a flange displacement amount on flange surfaces of an upper-half casing and a lower-half casing covering an outer periphery of a rotor in the rotary machine, a program for executing the method, and a device for performing the method.

This application claims priority based on JP 2022-027443 filed in Japan on Feb. 25, 2022, the contents of which are incorporated herein by reference.

BACKGROUND ART

A rotary machine such as a steam turbine includes a rotor rotatable about an axis extending in a horizontal direction, a casing covering an outer periphery of the rotor, and a stationary component such as a diaphragm disposed in the casing and attached to the casing. The casing typically includes an upper-half casing on an upper side, a lower-half casing on a lower side, and a plurality of bolts fastening the upper-half casing to the lower-half casing. The upper-half casing includes an upper flange formed with an upper flange surface facing downward. The lower-half casing includes a lower flange formed with a lower flange surface facing upward and opposing the upper flange surface in the vertical direction.

At the time of inspection of the rotary machine, the upper-half casing is removed from the lower-half casing to put the rotary machine into an open state, and a plurality of components constituting the rotary machine are inspected and repaired as necessary. The casing of the rotary machine such as a steam turbine may have inelastic deformation such as creep deformation due to the influence of, for example, heat, during operation. For this reason, the lower-half casing and the upper-half casing in the open state after being operated once are deformed from the factory default in a strict sense. Upon completion of the inspection, the plurality of components is assembled. This assembly step includes a step of fastening the upper-half casing to the lower-half casing by using the plurality of bolts to bring them into a fastened state. In the course of bringing the lower-half casing and the upper-half casing from the open state to the fastened state, the lower-half casing and the upper-half casing are further deformed.

A gap in a radial direction between the rotor and the stationary component attached to the casing needs to fall within a predetermined dimensional tolerance range. However, when the casing changes from the open state to the fastened state and the shapes of the lower-half casing and the upper-half casing are changed, the gap in the radial direction between the rotor and the stationary component attached to the casing is changed, and the gap may be out of the dimensional tolerance range.

Thus, in the technique described in JP 2019-070334 A, the deformation amounts of the lower-half casing and the upper-half casing that changes from the open state to the fastened state are estimated by the following steps. First, finite element models related to the three-dimensional shapes of the lower-half casing and the upper-half casing are acquired. Subsequently, three-dimensional shape data of the lower-half casing and the upper-half casing in the open state is acquired by actual measurement. Then, the finite element models are corrected using the measured three-dimensional shape data such that the finite element models match the measured three-dimensional shape data. Next, the fastened state is simulated using the corrected finite element models indicating the open state so as to create finite element models indicating the fastened state. Then, the deformation amounts of predetermined portions of the lower-half casing and the upper-half casing are estimated from the difference between the finite element models indicating the open state and the finite element models indicating the fastened state. The predetermined portions of the lower-half casing and the upper-half casing are the lower flange surface of the lower-half casing and the upper flange surface of the upper-half casing.

That is, the technique described in JP 2019-070334 A simulates the fastened state by using the finite element models indicating the open state and estimates the displacement amounts of the lower flange surface of the lower-half casing and the upper flange surface of the upper-half casing from the finite element models indicating the fastened state obtained by the simulation.

Since the technique described in JP 2019-070334 A simulates the fastened state using the finite element models indicating the open state, there is a problem in that a calculation load for executing the simulation is large. For this reason, the technique described in JP 2019-070334 A has an inherent problem that a preparation period is prolonged and costs for estimating the displacement amounts of the flange surfaces are large.

Therefore, an object of the present disclosure is to provide a technique for reducing the calculation load for estimating displacement amounts of flange surfaces of an upper-half casing and a lower-half casing, allowing a preparation period and costs for the estimation of the flange surfaces to be reduced.

SUMMARY OF THE INVENTION

A method for estimating a flange displacement amount in a rotary machine as one aspect for achieving the above-described object is applied to a rotary machine below.

The rotary machine includes a rotor rotatable about an axis extending in a horizontal direction, a casing covering an outer periphery of the rotor, a stationary component disposed in the casing and attached to the casing, and a base frame supporting the casing from below. The casing includes an upper-half casing on an upper side, a lower-half casing on a lower side, and a plurality of bolts fastening the upper-half casing to the lower-half casing. The upper-half casing includes an upper flange formed with an upper flange surface facing downward. The lower-half casing includes a lower flange formed with a lower flange surface facing upward and opposing the upper flange surface in the vertical direction, and a first supported portion and a second supported portion that are continuous with the lower flange, supported by the base frame from below, and separated from each other in an axial direction in which the axis extends. The upper flange and the lower flange include bolt holes extending therethrough in the vertical direction, and the respective plurality of bolts can be inserted into the bolt holes. An upper surface of the first supported portion and an upper surface of the second supported portion are shifted in the vertical direction with respect to the lower flange surface.

The method for estimating a flange displacement amount in a rotary machine above includes:

a measured coordinate receiving step of receiving measured three-dimensional coordinate data at a plurality of positions on the upper flange surface and measured three-dimensional coordinate data at a plurality of positions on the lower flange surface, the measured three-dimensional coordinate data being measured after the rotary machine is disassembled and in an open state where the upper-half casing is not fastened to the lower-half casing by the plurality of bolts;

an effective coordinate determining step of determining effective three-dimensional coordinate data at a lower first position, a lower second position, and a lower target position by using the measured three-dimensional coordinate data at the plurality of positions on the lower flange surface, the lower first position being coincident with a first representative position to which a largest load is applied in the first supported portion in a horizontal direction on a virtual plane continuous with the lower flange surface, the lower second position being coincident with a second representative position to which a largest load is applied in the second supported portion in the horizontal direction on the virtual plane continuous with the lower flange surface, and the lower target position being a position on the lower flange surface from which a displacement amount in a vertical direction when a state changes from the open state to a fastened state where the upper-half casing is fastened to the lower-half casing by the plurality of bolts is to be obtained, and determining effective three-dimensional coordinate data at an upper first position, an upper second position, and an upper target position by using the measured three-dimensional coordinate data at the plurality of positions on the upper flange surface, the upper first position being coincident with the first representative position in the horizontal direction on a virtual plane continuous with the upper flange surface, the upper second position being coincident with the second representative position in the horizontal direction on the virtual plane continuous with the upper flange surface, and the upper target position being coincident with the lower target position in the horizontal direction on the upper flange surface;

a coordinate change step of changing the effective three-dimensional coordinate data determined in the effective coordinate determining step such that the effective three-dimensional coordinate data at the lower first position and the effective three-dimensional coordinate data at the upper first position determined in the effective coordinate determining step are coincident with each other, and the effective three-dimensional coordinate data at the lower second position and the effective three-dimensional coordinate data at the upper second position determined in the effective coordinate determining step are coincident with each other;

a displacement amount calculation step of calculating a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after the coordinate change step and a position in the vertical direction indicated by the effective three-dimensional coordinate data at the lower target position after the coordinate change step. The effective coordinate determining step includes:

a first processing step of determining effective three-dimensional coordinate data at a lower edge first position indicating a position of a boundary with the first supported portion on the lower flange surface, a lower edge second position indicating a position of a boundary with the second supported portion on the lower flange surface, and the lower target position by using the measured three-dimensional coordinate data at the plurality of positions on the lower flange surface and determining effective three-dimensional coordinate data at an upper edge first position, an upper edge second position, and the upper target position by using the measured three-dimensional coordinate data at the plurality of positions on the upper flange surface, the upper edge first position being coincident with the lower edge first position in the horizontal direction on the upper flange surface, the upper edge second position being coincident with the lower edge second position in the horizontal direction on the upper flange surface; and a second processing step of estimating effective three-dimensional coordinate data at the lower first position and the lower second position from a change tendency of effective three-dimensional coordinate data at the plurality of positions on the lower flange surface including the lower edge first position and the lower edge second position and estimating effective three-dimensional coordinate data at the upper first position and the upper second position from a change tendency of effective three-dimensional coordinate data at the plurality of positions on the upper flange surface including the upper edge first position and the upper edge second position.

In the present aspect, the displacement amounts of the upper target position and the lower target position in the vertical direction when the casing changes from the open state to the fastened state are calculated in accordance with the difference between the position on the upper flange surface in the vertical direction of the upper target position from which a displacement amount in the vertical direction when the casing changes from the open state to the fastened state is to be obtained and the position on the lower flange surface in the vertical direction of the lower target position from which a displacement amount in the vertical direction when the casing changes from the open state to the fastened state is to be obtained. Accordingly, the present aspect can calculate the displacement amounts of the upper target position U and the lower target position in the vertical direction without simulating the deformation of the lower-half casing and the upper-half casing by using finite element models of the lower-half casing and the upper-half casing. Therefore, the present aspect can reduce the calculation load for calculating the displacement amounts.

The present aspect needs three-dimensional coordinate data at the following four points in the open state in obtaining the displacement amounts of the upper target position and the lower target position in the vertical direction.

a) The lower first position that is coincident with the first representative position at which the largest load is applied in the first supported portion in the horizontal direction on a surface continuous with the lower flange surface b) The lower second position that is coincident with the second representative position at which the largest load is applied in the second supported portion in the horizontal direction on a surface continuous with the lower flange surface c) The upper first position that is coincident with the first representative position in the horizontal direction on a surface continuous with the upper flange surface d) The upper second position that is coincident with the second representative position in the horizontal direction on a surface continuous with the upper flange surface The present aspect estimates the effective three-dimensional coordinate data at the above-described four points by executing the first processing step and the second processing step. Accordingly, the present aspect can calculate the displacement amounts of the upper target position and the lower target position in a vertical direction Dz even when the upper surface of the first supported portion and the upper surface of the second supported portion are shifted in the vertical direction with respect to the lower flange surface and the measured three-dimensional coordinate data of the lower first position, the lower second position, the upper first position, and the upper second position cannot be acquired.

A program for estimating a flange displacement amount in a rotary machine as one aspect for achieving the above-described object is applied to a rotary machine below:

The rotary machine includes a rotor rotatable about an axis extending in a horizontal direction, a casing covering an outer periphery of the rotor, a stationary component disposed in the casing and attached to the casing, and a base frame supporting the casing from below: The casing includes an upper-half casing on an upper side, a lower-half casing on a lower side, and a plurality of bolts fastening the upper-half casing to the lower-half casing. The upper-half casing includes an upper flange formed with an upper flange surface facing downward. The lower-half casing includes a lower flange formed with a lower flange surface facing upward and opposing the upper flange surface in the vertical direction, and a first supported portion and a second supported portion that are continuous with the lower flange, supported by the base frame from below; and separated from each other in an axial direction in which the axis extends. The upper flange and the lower flange include bolt holes extending therethrough in the vertical direction, and the respective plurality of bolts can be inserted into the bolt holes. An upper surface of the first supported portion and an upper surface of the second supported portion are shifted in the vertical direction with respect to the lower flange surface.

The program for estimating a flange displacement amount in a rotary machine causes a computer to execute:

a measured coordinate receiving step of receiving measured three-dimensional coordinate data at a plurality of positions on the upper flange surface and measured three-dimensional coordinate data at a plurality of positions on the lower flange surface, the measured three-dimensional coordinate data being measured after the rotary machine is disassembled and in an open state where the upper-half casing is not fastened to the lower-half casing by the plurality of bolts;

an effective coordinate determining step of determining effective three-dimensional coordinate data at a lower first position, a lower second position, and a lower target position by using the measured three-dimensional coordinate data at the plurality of positions on the lower flange surface, the lower first position being coincident with a first representative position to which a largest load is applied in the first supported portion in a horizontal direction on a virtual plane continuous with the lower flange surface, the lower second position being coincident with a second representative position to which a largest load is applied in the second supported portion in the horizontal direction on the virtual plane continuous with the lower flange surface, and the lower target position being a position on the lower flange surface from which a displacement amount in a vertical direction when a state changes from the open state to a fastened state where the upper-half casing is fastened to the lower-half casing by the plurality of bolts is to be obtained, and determining effective three-dimensional coordinate data at an upper first position, an upper second position, and an upper target position by using the measured three-dimensional coordinate data at the plurality of positions on the upper flange surface, the upper first position being coincident with the first representative position in the horizontal direction on a virtual plane continuous with the upper flange surface, the upper second position being coincident with the second representative position in the horizontal direction on the virtual plane continuous with the upper flange surface, and the upper target position being coincident with the lower target position in the horizontal direction on the upper flange surface;

a coordinate change step of changing the effective three-dimensional coordinate data determined in the effective coordinate determining step such that the effective three-dimensional coordinate data at the lower first position and the effective three-dimensional coordinate data at the upper first position determined in the effective coordinate determining step are coincident with each other, and the effective three-dimensional coordinate data at the lower second position and the effective three-dimensional coordinate data at the upper second position determined in the effective coordinate determining step are coincident with each other;

a displacement amount calculation step of calculating a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after the coordinate change step and a position in the vertical direction indicated by the effective three-dimensional coordinate data at the lower target position after the coordinate change step. The effective coordinate determining step includes:

a first processing step of determining effective three-dimensional coordinate data at a lower edge first position indicating a position of a boundary with the first supported portion on the lower flange surface, a lower edge second position indicating a position of a boundary with the second supported portion on the lower flange surface, and the lower target position by using the measured three-dimensional coordinate data at the plurality of positions on the lower flange surface and determining effective three-dimensional coordinate data at an upper edge first position, an upper edge second position, and the upper target position by using the measured three-dimensional coordinate data at the plurality of positions on the upper flange surface, the upper edge first position being coincident with the lower edge first position in the horizontal direction on the upper flange surface, the upper edge second position being coincident with the lower edge second position in the horizontal direction on the upper flange surface; and a second processing step of estimating effective three-dimensional coordinate data at the lower first position and the lower second position from a change tendency of effective three-dimensional coordinate data at the plurality of positions on the lower flange surface including the lower edge first position and the lower edge second position and estimating effective three-dimensional coordinate data at the upper first position and the upper second position from a change tendency of effective three-dimensional coordinate data at the plurality of positions on the upper flange surface including the upper edge first position and the upper edge second position.

In the present aspect, causing the computer to execute the program can reduce the calculation load for calculating the displacement amounts similar to the one aspect of the method for estimating a flange displacement amount. Further, similar to an aspect of a method for estimating a flange displacement amount, the present aspect can calculate, by causing the computer to execute the program, the displacement amounts of the upper target position and the lower target position in the vertical direction even when the upper surface of the first supported portion and the upper surface of the second supported portion are shifted in the vertical direction with respect to the lower flange surface and the measured three-dimensional coordinate data of the lower first position, the lower second position, the upper first position, and the upper second position cannot be acquired.

A device for a flange displacement amount in a rotary machine as one aspect for achieving the above-described object is applied to a rotary machine below:

The rotary machine includes a rotor rotatable about an axis extending in a horizontal direction, a casing covering an outer periphery of the rotor, a stationary component disposed in the casing and attached to the casing, and a base frame supporting the casing from below: The casing includes an upper-half casing on an upper side, a lower-half casing on a lower side, and a plurality of bolts fastening the upper-half casing to the lower-half casing. The upper-half casing includes an upper flange formed with an upper flange surface facing downward. The lower-half casing includes a lower flange formed with a lower flange surface facing upward and opposing the upper flange surface in the vertical direction, and a first supported portion and a second supported portion that are continuous with the lower flange, supported by the base frame from below; and separated from each other in an axial direction in which the axis extends. The upper flange and the lower flange include bolt holes extending therethrough in the vertical direction, and the respective plurality of bolts can be inserted into the bolt holes. An upper surface of the first supported portion and an upper surface of the second supported portion are shifted in the vertical direction with respect to the lower flange surface.

The device for estimating a flange displacement amount in a rotary machine above includes:

a measured coordinate receiving unit configured to receive measured three-dimensional coordinate data at a plurality of positions on the upper flange surface and measured three-dimensional coordinate data at a plurality of positions on the lower flange surface, the measured three-dimensional coordinate data being measured after the rotary machine is disassembled and in an open state where the upper-half casing is not fastened to the lower-half casing by the plurality of bolts;

an effective coordinate determining unit configured to determine effective three-dimensional coordinate data at a lower first position, a lower second position, and a lower target position by using the measured three-dimensional coordinate data at the plurality of positions on the lower flange surface, the lower first position being coincident with a first representative position to which a largest load is applied in the first supported portion in a horizontal direction on a virtual plane continuous with the lower flange surface, the lower second position being coincident with a second representative position to which a largest load is applied in the second supported portion in the horizontal direction on the virtual plane continuous with the lower flange surface, and the lower target position being a position on the lower flange surface from which a displacement amount in a vertical direction when a state changes from the open state to a fastened state where the upper-half casing is fastened to the lower-half casing by the plurality of bolts is to be obtained, and determine effective three-dimensional coordinate data at an upper first position, an upper second position, and an upper target position by using the measured three-dimensional coordinate data at the plurality of positions on the upper flange surface, the upper first position being coincident with the first representative position in the horizontal direction on a virtual plane continuous with the upper flange surface, the upper second position being coincident with the second representative position in the horizontal direction on the virtual plane continuous with the upper flange surface, and the upper target position being coincident with the lower target position in the horizontal direction on the upper flange surface;

a coordinate change unit configured to change the effective three-dimensional coordinate data determined by the effective coordinate determining unit such that the effective three-dimensional coordinate data at the lower first position and the effective three-dimensional coordinate data at the upper first position determined by the effective coordinate determining unit are coincident with each other, and the effective three-dimensional coordinate data at the lower second position and the effective three-dimensional coordinate data at the upper second position determined by the effective coordinate determining unit are coincident with each other;

a displacement amount calculation unit configured to calculate a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after a coordinate change and a position in the vertical direction indicated by the effective three-dimensional coordinate data at the lower target position after the coordinate change. The effective coordinate determining unit includes:

a first processing unit configured to determine effective three-dimensional coordinate data at a lower edge first position indicating a position of a boundary with the first supported portion on the lower flange surface, a lower edge second position indicating a position of a boundary with the second supported portion on the lower flange surface, and the lower target position by using the measured three-dimensional coordinate data at the plurality of positions on the lower flange surface L and determine effective three-dimensional coordinate data at an upper edge first position, an upper edge second position, and the upper target position by using the measured three-dimensional coordinate data at the plurality of positions on the upper flange surface, the upper edge first position being coincident with the lower edge first position in the horizontal direction on a surface continuous with the upper flange surface, the upper edge second position being coincident with the lower edge second position in the horizontal direction on a surface continuous with the upper flange surface; and a second processing unit configured to estimate effective three-dimensional coordinate data at the lower first position and the lower second position from a change tendency of effective three-dimensional coordinate data at the plurality of positions on the lower flange surface including the lower edge first position and the lower edge second position and estimate effective three-dimensional coordinate data at the upper first position and the upper second position from a change tendency of effective three-dimensional coordinate data at the plurality of positions on the upper flange surface including the upper edge first position and the upper edge second position.

The present aspect can reduce the calculation load for calculating the displacement amounts similar to the one aspect of the method for estimating a flange displacement amount. Further, similar to an aspect of a method for estimating a flange displacement amount, the present aspect can calculate, by causing the computer to execute the program, the displacement amounts of the upper target position and the lower target position in the vertical direction even when the upper surface of the first supported portion and the upper surface of the second supported portion are shifted in the vertical direction with respect to the lower flange surface and the measured three-dimensional coordinate data of the lower first position, the lower second position, the upper first position, and the upper second position cannot be acquired.

Advantageous Effects of Invention

One aspect of the present disclosure can estimate the displacement amounts of the flange surfaces of the upper-half casing and the lower-half casing while reducing the calculation load. As a result, one aspect of the present disclosure can reduce a preparation period and costs for the estimation of the flange surfaces. Further, one aspect of the present disclosure can calculate the displacement amounts of the upper target position and the lower target position in the vertical direction even when the upper surface of the first supported portion and the upper surface of the second supported portion are shifted in the vertical direction with respect to the lower flange surface and the measured three-dimensional coordinate data of the lower first position, the lower second position, the upper first position, and the upper second position cannot be acquired.

DETAILED DESCRIPTION OF THE INVENTION

Embodiments of a method for estimating a flange displacement amount in a rotary machine, a program for executing the method, and a device for performing the method according to the present disclosure will be described below.

Embodiment of Rotary Machine

A rotary machine in the present embodiment will be described with reference to FIGS. 1 to 5.

Figure 1:
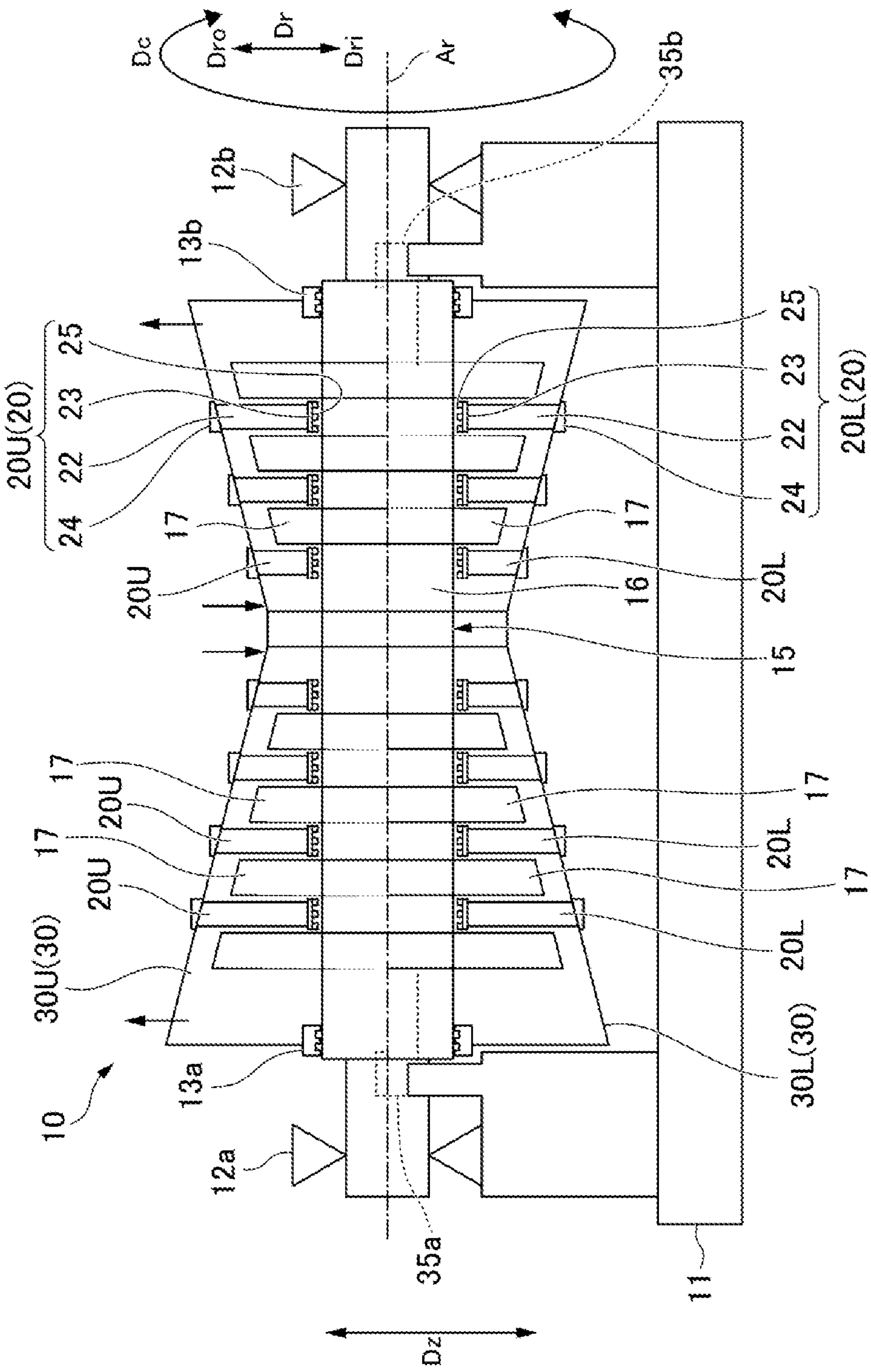
FIG. 1 is a schematic diagram illustrating a schematic configuration of a steam turbine that is a rotary machine according to an embodiment of the present disclosure.
Figure 2:
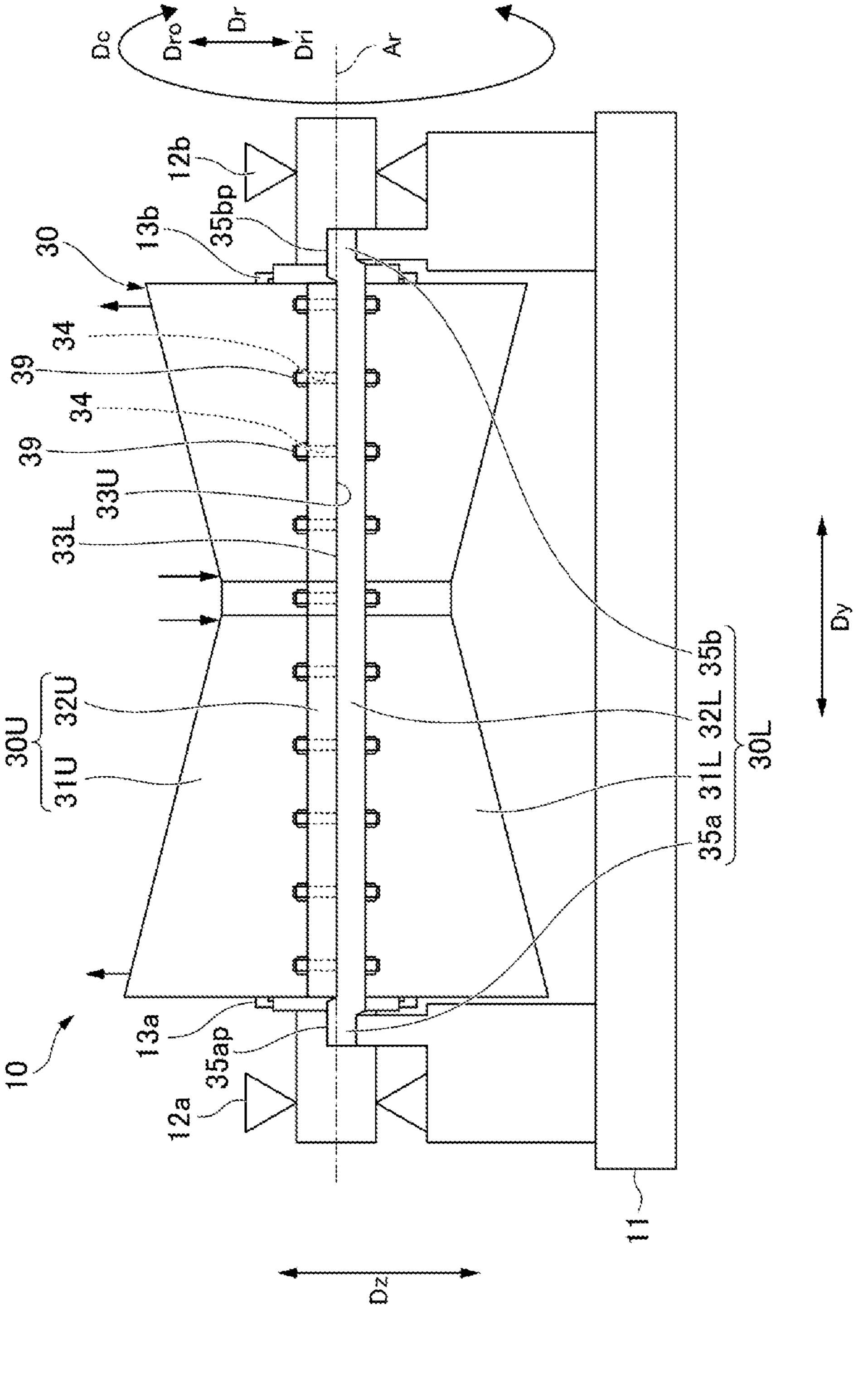
FIG. 2 is a schematic diagram illustrating an outline of a steam turbine that is a rotary machine according to the embodiment the present disclosure.
Figure 3:
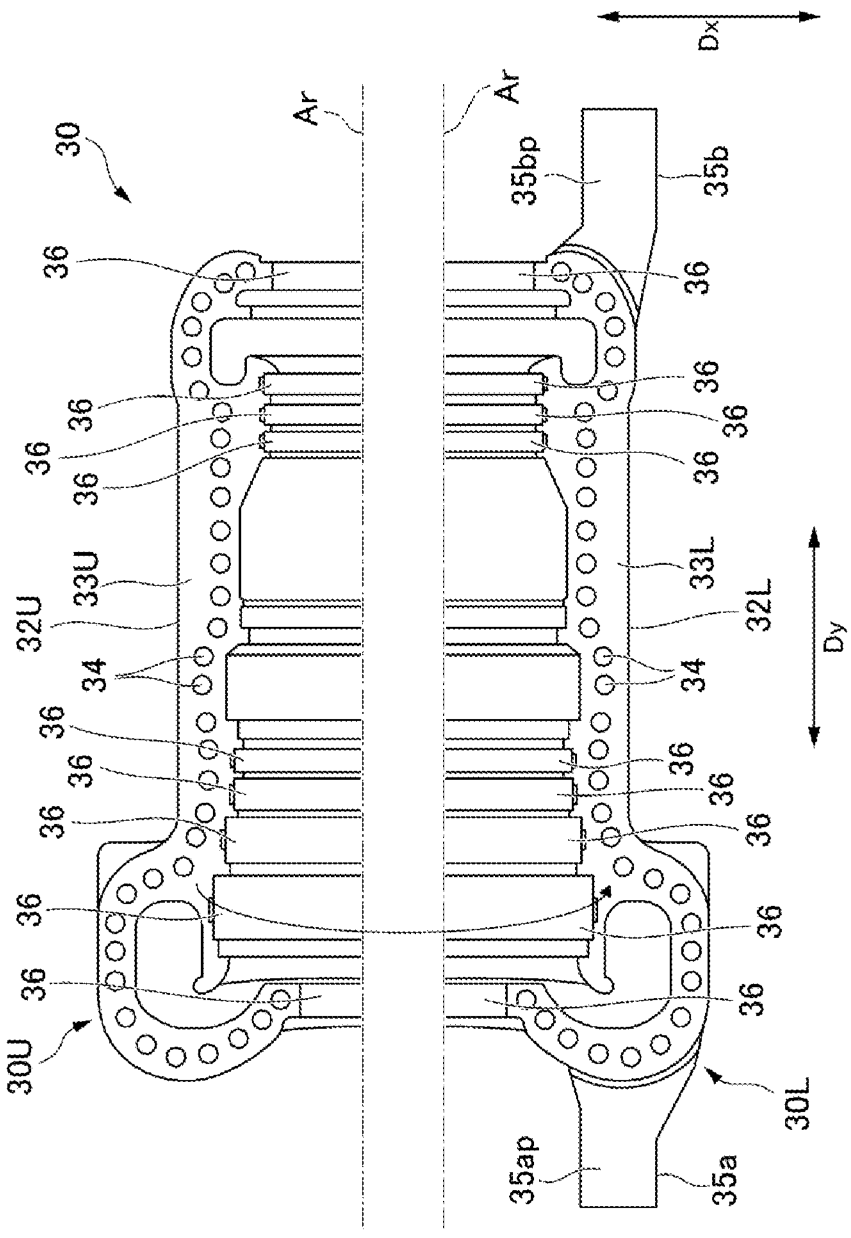
FIG. 3 is a plan view illustrating a main part of an upper-half casing and a main part of a lower-half casing in the embodiment according to the present disclosure.

As illustrated in FIGS. 1 and 2, the rotary machine in the present embodiment is a steam turbine 10. The steam turbine 10 includes a rotor 15 that rotates around an axis Ar extending in the horizontal direction, a casing 30 that covers an outer periphery side of the rotor 15, a first shaft bearing device 12*a* and a second shaft bearing device 12*b* that rotatably support the rotor 15, a plurality of diaphragms 20, a first shaft sealing device 13*a* and a second shaft sealing device 13*b* that seal gaps between the casing 30 and the rotor 15, and a base frame 11 that supports the casing 30 from below.

Here, a direction in which the axis Ar extends is referred to as an axial direction Dy, a circumferential direction with respect to the axis Ar is simply referred to as a circumferential direction Dc, and a radial direction with respect to the axis Ar is simply referred to as a radial direction Dr. Further, in the radial direction Dr, a side closer to the axis Ar is referred to as a radial inner side Dri, and a side far from the axis Ar is referred to as a radial outer side Dro. In addition, among the reference signs used in the drawings, U means an upper half and L means a lower half.

The rotor 15 includes a rotor shaft 16 extending in the axial direction Dy, and a plurality of rotor blade rows 17 mounted on the rotor shaft 16 along the axial direction Dy. Each of the plurality of rotor blade rows 17 includes a plurality of rotor blades aligned in the circumferential direction Dc with respect to the axis Ar. Both end portions of the rotor shaft 16 protrude from the casing 30 in the axial direction Dy. One end portion of the rotor shaft 16 in the axial direction Dy is rotatably supported by the first shaft bearing device 12*a* mounted on the base frame 11. The other end portion of the rotor shaft 16 in the axial direction Dy is rotatably supported by the second shaft bearing device 12*b* mounted on the base frame 11.

The first shaft sealing device 13*a* is provided at one end portion of the casing 30 in the axial direction Dy. The second shaft sealing device 13*b* is provided at the other end portion of the casing 30 in the axial direction Dy. Each of the first shaft sealing device 13*a* and the second shaft sealing device 13*b* is a device that seals a gap between the rotor shaft 16 and the casing 30.

The plurality of diaphragms 20 are aligned in the axial direction Dy in the casing 30. Each of the plurality of diaphragms 20 includes a lower-half diaphragm 20L that constitutes a portion below the axis Ar and an upper-half diaphragm 20U that constitutes a portion above the axis Ar. Each of the lower-half diaphragm 20L and the upper-half diaphragm 20U includes a plurality of stator vanes 22 aligned in the circumferential direction Dc, a diaphragm inner ring 23 that connects portions of the plurality of stator vanes 22 on the radial inner side Dri to each other, a diaphragm outer ring 24 that connects portions of the plurality of stator vanes 22 on the radial outer side Dro to each other, and a sealing device 25 mounted on the radial inner side Dri of the diaphragm inner ring 23. The sealing device 25 is a sealing device that seals a gap between the diaphragm inner ring 23 and the rotor shaft 16.

Each of the first shaft sealing device 13*a*, the second shaft sealing device 13*b*, and the plurality of diaphragms 20 described above is a stationary component that extends in the circumferential direction with respect to the axis Ar and is attached to the casing 30.

As illustrated in FIG. 2, the casing 30 includes a lower-half casing 30L that constitutes a portion below the axis Ar, an upper-half casing 30U that constitutes a portion above the axis Ar, and a plurality of bolts 39 for fastening the upper-half casing 30U to the lower-half casing 30L. The lower-half casing 30L includes a lower-half casing main body 31L extending in the circumferential direction Dc, a lower flange 32L protruding from both end portions of the lower-half casing main body 31L in the circumferential direction Dc toward the radial outer side Dro, and a first supported portion 35*a* and a second supported portion 35*b* that are continuous with the lower flange 32L and are supported by the base frame 11 from below. The upper-half casing 30U includes an upper-half casing main body 31U extending in the circumferential direction Dc and an upper flange 32U protruding from both end portions of the upper-half casing main body 31U in the circumferential direction Dc toward the radial outer side Dro. Note that, the upper flange 32U is not provided with portions opposing the first supported portion 35*a* and the second supported portion 35*b* of the lower flange 32L. However, the upper flange 32U may be provided with portions opposing the first supported portion 35*a* and the second supported portion 35*b* of the lower flange 32L.

As illustrated in FIGS. 2 to 5, a surface of the lower flange 32L facing upward constitutes a lower flange surface 33L. A surface of the upper flange 32U facing downward constitutes an upper flange surface 33U. The lower flange surface 33L and the upper flange surface 33U face each other in a vertical direction Dz.

The first supported portion 35*a* protrudes from one side of both sides of the lower flange 32L in the axial direction Dy toward the one side. The second supported portion 35*b* protrudes from the other side of the both sides of the lower flange 32L in the axial direction Dy toward the other side. Thus, the second supported portion 35*a* is separated from the first supported portion 35*b* in the axial direction Dy. In the present embodiment, an upper surface 35*ap* of the first supported portion 35*a* and an upper surface 35*bp* of the second supported portion 35*b* are shifted in the vertical direction Dz with respect to the lower flange surface 33L. When the upper flange 32U is provided with portions corresponding to the first supported portion 35*a* and the second supported portion 35*b* in the lower flange 32L, an lower surface of the portion corresponding to the first supported portion 35*a* and a lower surface of the portion corresponding to the second supported portion 35*b* are shifted in the vertical direction Dz with respect to the upper flange surface 33U.

The lower flange 32L and the upper flange 32U are formed with bolt holes 34 which extend therethrough in the vertical direction Dz, and the respective plurality of bolts 39 can be inserted into the bolt holes 34. The lower-half casing 30L and the upper-half casing 30U are fastened by the bolts 39 inserted into the bolt holes 34 of the lower flange 32L and the bolt holes 34 of the upper flange 32U.

An inside surface of the lower-half casing main body 31L and an inside surface of the upper-half casing 30U are formed with stationary component storage portions 36 in which the respective plurality of stationary components described above is stored. Each of the stationary component storage portions 36 of the lower-half casing main body 31L is a groove that is recessed from the inside surface of the lower-half casing main body 31L toward the radial outer side Dro and extends in the circumferential direction Dc. Each of the stationary component storage portions 36 of the upper-half casing main body 31U is a groove that is recessed from the inside surface of the upper-half casing main body 31U toward the radial outer side Dro and extends in the circumferential direction Dc. The diaphragm 20, which is one of the stationary components, is supported by a portion near the flange surface of the stationary component storage portion 36 extending in the circumferential direction Dc.

Figure 4:
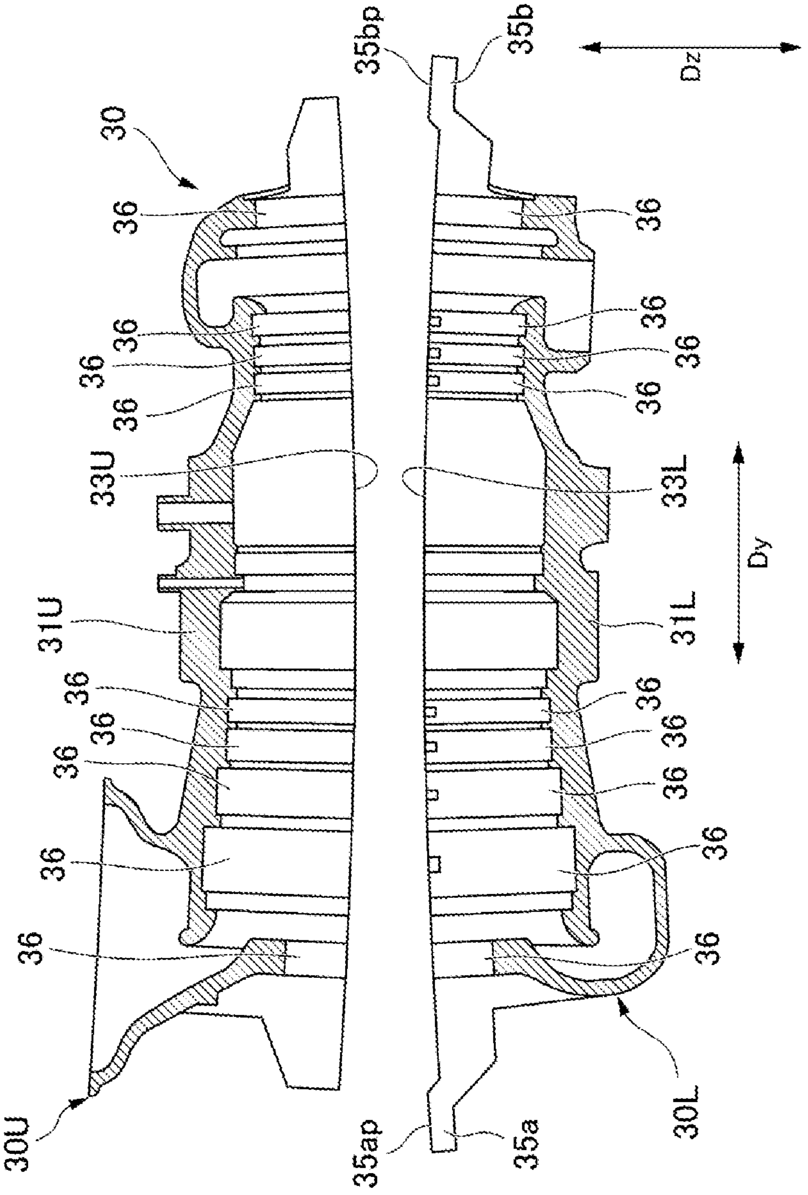
FIG. 4 is a cross-sectional view illustrating a casing in an open state in the embodiment according to the present disclosure.

An inside surface of the casing 30 is exposed to high-temperature steam generated by the operation of the steam turbine 10. Thus, the casing 30 may undergo inelastic deformation such as creep deformation due to the operation of the steam turbine 10. As a result of this deformation, in the open state where the upper-half casing 30U is not fastened to the lower-half casing 30L, the positions of the lower flange surface 33L and the upper flange surface 33U in the vertical direction Dz are shifted according to a location in the axial direction Dy as illustrated in FIG. 4.

Figure 5:
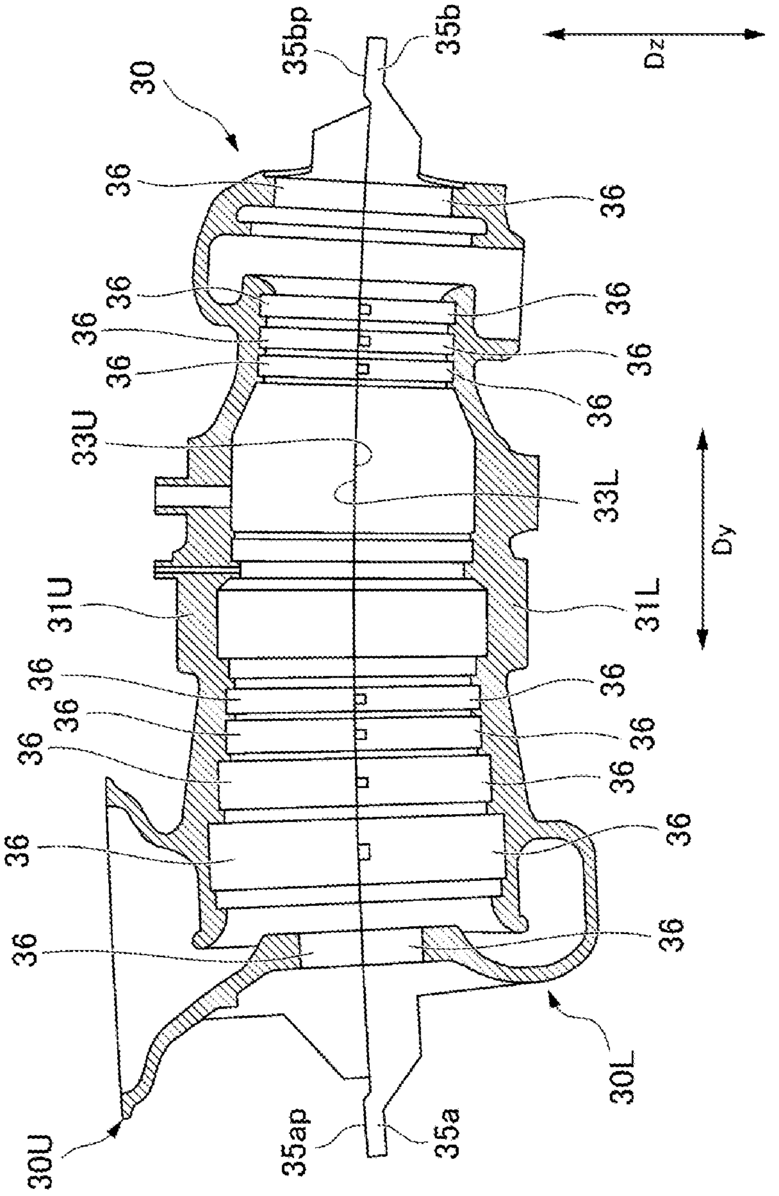
FIG. 5 is a cross-sectional view illustrating the casing in a fastened state in the embodiment according to the present disclosure.

When the upper-half casing 30U deformed as described above is fastened to the lower-half casing 30L deformed as described above to bring the casing 30 into the fastened state, the positions of the lower flange surface 33L and the upper flange surface 33U in the vertical direction Dz are further shifted according to a location in the axial direction Dy as illustrated in FIG. 5.

Gaps in the radial direction Dr between the stationary components attached to the casing 30 and the rotor 15 need to fall within a predetermined dimensional tolerance range. For example, a gap between the rotor shaft 16 and each of the first shaft sealing device 13*a* and the second shaft sealing device 13*b*, which are stationary components, and a gap between the rotor shaft 16 and the sealing device 25 of the diaphragm 20 need to fall within a predetermined dimensional tolerance range. However, even if there are shape data of the lower-half casing 30L and shape data of the upper-half casing 30U in the open state, when the casing 30 changes from the open state to the fastened state and the shapes of the lower-half casing 30L and the upper-half casing 30U are changed, the gaps in the radial direction Dr between the stationary components and the rotor 15 are changed and the gaps may be out of the dimensional tolerance range.

The present inventors have found that changes in the gaps in the radial direction Dr between the stationary components and the rotor 15 due to the deformation of the lower-half casing 30L and the upper-half casing 30U by changing from the open state to the fastened state are dominant over the deformation of the lower flange surface 33L and the upper flange surface 33U. In view of this, the inventors estimate a displacement amount of the lower flange surface 33L and a displacement amount of the upper flange surface 33U by changing from the open state to the fastened state, and grasp the gaps in the radial direction Dr between the stationary components and the rotor 15 in the fastened state in accordance with these displacement amounts.

Hereinafter, a device for estimating a flange displacement amount and a method for estimating a flange displacement amount for estimating the displacement amount of the lower flange surface 33L and the displacement amount of the upper flange surface 33U will be described.

Embodiment of Device for Estimating Flange Displacement Amount

Figure 6:
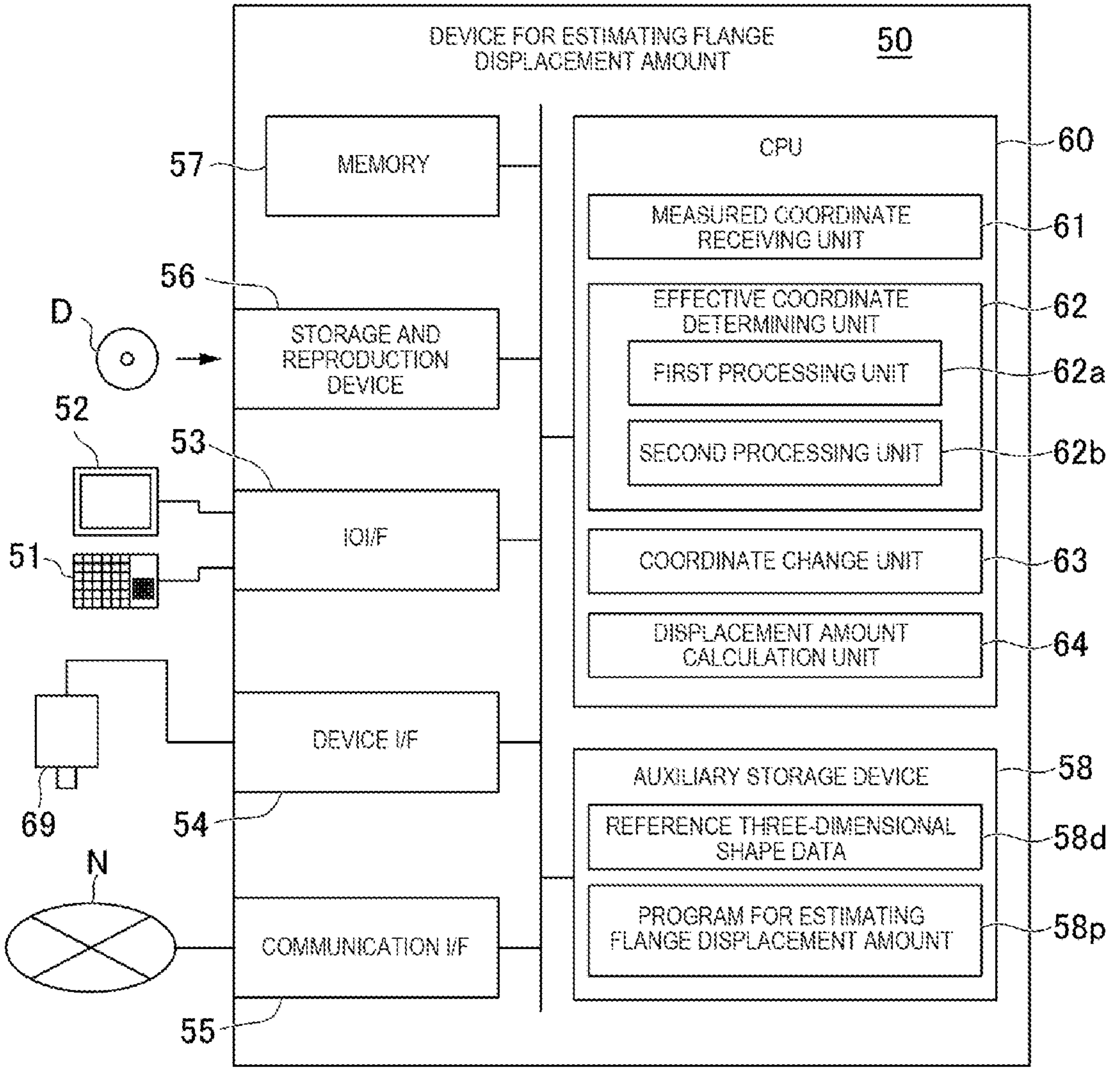
FIG. 6 is a functional block diagram of a device for estimating a flange displacement amount in the embodiment according to the present disclosure.

A device for estimating a flange displacement amount according to the present embodiment will be described with reference to FIG. 6.

A device for estimating a flange displacement amount 50 is a computer. The device for estimating a flange displacement amount 50 includes a central processing unit (CPU) 60 that performs various operations, a memory 57 that serves as a working area or the like for the CPU 60, an auxiliary storage device 58 such as a hard disk drive device, a manual input device (input device) 51 such as a keyboard or a mouse, a display device (output device) 52, an input/output interface 53 for the manual input device 51 and the display device 52, a device interface (input device) 54 for transmitting and receiving data to and from a three-dimensional shape measuring device 69 such as a three-dimensional laser measuring device, a communication interface (input/output device) 55 for communicating with the outside via a network N, and a storage and reproduction device (input/output device) 56 that performs data storage processing and data reproduction processing for a disk storage medium D which is a non-transitory storage medium.

The auxiliary storage device 58 stores in advance a program for estimating a flange displacement amount 58*p* and reference three-dimensional shape data 58*d* for each of a plurality of components constituting the steam turbine 10. The reference three-dimensional shape data 58*d* may be three-dimensional design data or may be, for example, three-dimensional data obtained through actual measurement before the steam turbine 10 is shipped from a factory. That is, the reference three-dimensional shape data 58*d* only needs to be three-dimensional data obtained ahead of operation before a periodic inspection. Three-dimensional coordinate data at respective positions of the plurality of components can be obtained from the reference three-dimensional shape data 58*d*. The program for estimating a flange displacement amount 58*p* is loaded into the auxiliary storage device 58 from the disk storage medium D, which is a non-transitory storage medium, via the storage and reproduction device 56, for example. Note that the program for estimating a flange displacement amount 58*p* may be loaded into the auxiliary storage device 58 from an external device via the communication interface 55.

The CPU 60 functionally includes a measured coordinate receiving unit 61, an effective coordinate determining unit 62, a coordinate change unit 63, and a displacement amount calculation unit 64. The effective coordinate determining unit 62 includes a first processing unit 62*a* and a second processing unit 62*b*. Each of these functional units 61 to 64 is enabled by the CPU 60 executing the program for estimating a flange displacement amount 58*p* stored in the auxiliary storage device 58. The operations of these functional units 61 to 64 will be described later.

Embodiment of Method for Estimating Flange Displacement Amount

Figure 7:
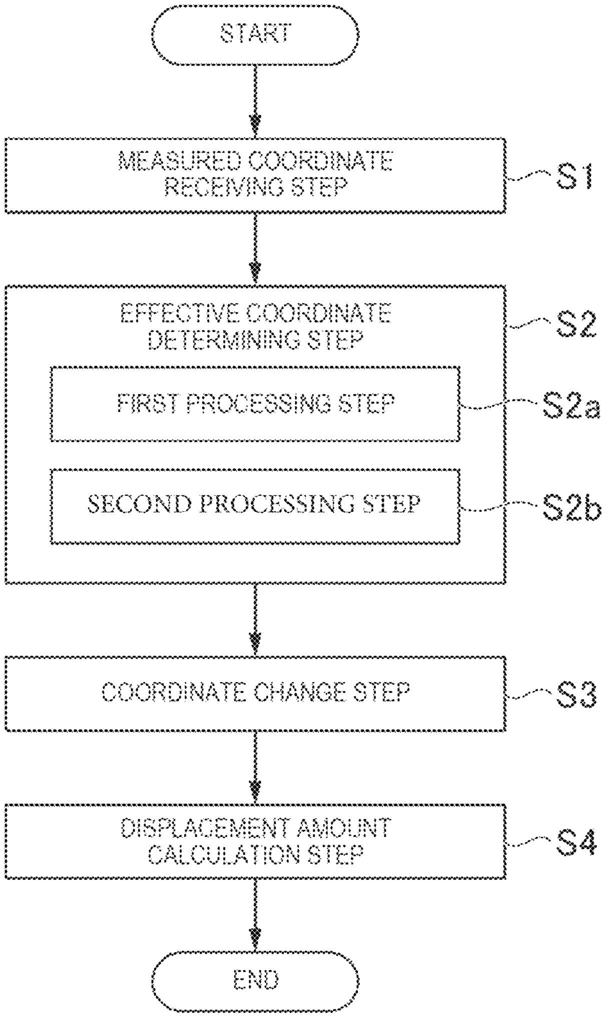
FIG. 7 is a flowchart illustrating a procedure for a method for estimating a flange displacement amount in the embodiment according to the present disclosure.

A method for estimating a flange displacement amount according to the present embodiment will be described in accordance with a flowchart illustrated in FIG. 7. The method for estimating a flange displacement amount is executed by the device for estimating a flange displacement amount described above.

The steam turbine 10 is disassembled and reassembled each time an inspection or the like is performed. When the disassembly of the steam turbine 10 is completed, the upper-half casing 30U is removed from the lower-half casing 30L as illustrated in FIG. 4. As a result, the casing 30 is in the open state where the upper-half casing 30U and the lower-half casing 30L are not fastened by the bolts 39. Further, the rotor 15, the plurality of diaphragms 20, the first shaft sealing device 13*a*, and the second shaft sealing device 13*b* are removed from the casing 30 and placed outside the casing 30. The lower-half casing 30L may be removed from the base frame 11 when the disassembly of the steam turbine 10 is completed, but here, it is assumed that the lower-half casing 30L is supported by the base frame 11.

When the steam turbine 10 is disassembled and the casing 30 is in the open state as described above, an operator measures three-dimensional coordinate values at a plurality of positions on the upper flange surface 33U and three-dimensional coordinate values at a plurality of positions on the lower flange surface 33L by using the three-dimensional shape measuring device 69 such as a three-dimensional laser measuring device. Then, the operator causes the three-dimensional shape measuring device 69 to transfer, as measured three-dimensional coordinate data, the three-dimensional coordinate values at the plurality of positions on the upper flange surface 33U and the three-dimensional coordinate values at the plurality of positions on the lower flange surface 33L to the device for estimating a flange displacement amount 50. The measured coordinate receiving unit 61 of the device for estimating a flange displacement amount 50 receives the measured three-dimensional coordinate data at the plurality of positions on the upper flange surface 33U and the measured three-dimensional coordinate data at the plurality of positions on the lower flange surface 33L (measured coordinate receiving step S1).

The three-dimensional coordinate data according to the present embodiment includes a coordinate value indicating a position in the axial direction Dy extending in the horizontal direction, a coordinate value indicating a position in the vertical direction Dz perpendicular to the axial direction Dy, and a coordinate value indicating a position in a lateral direction Dx perpendicular to the axial direction Dy in the horizontal direction.

Figure 8:
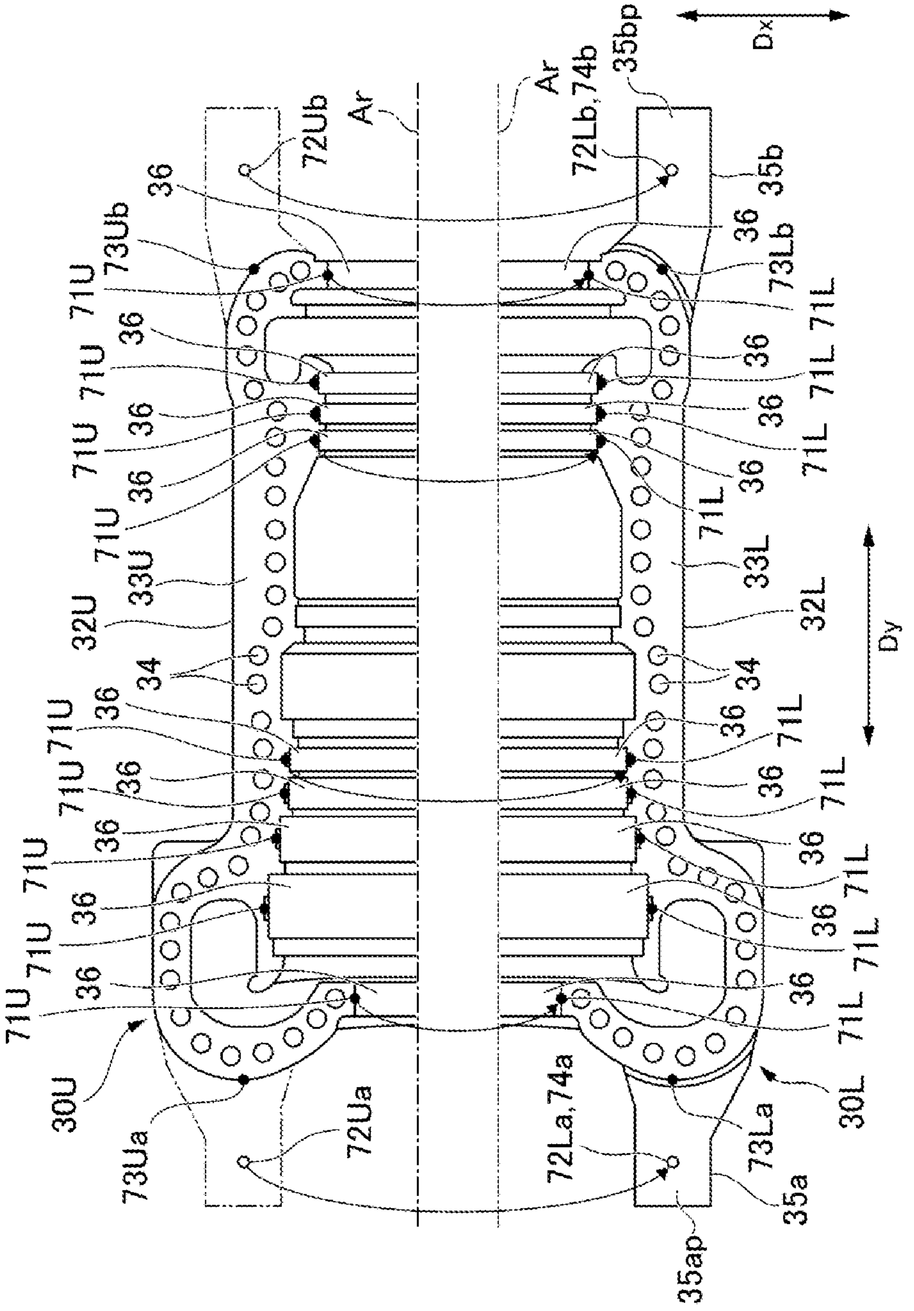
FIG. 8 is an explanatory diagram illustrating positions on a flange surface at which effective three-dimensional coordinate data is determined in the embodiment according to the present disclosure.

When the measured coordinate receiving unit 61 receives a plurality of pieces of the measured three-dimensional coordinate data, the effective coordinate determining unit 62 of the device for estimating a flange displacement amount 50 determines effective three-dimensional coordinate data at a plurality of lower target positions 71L, a lower first position 72La, a lower second position 72Lb, a plurality of upper target positions 71U, an upper first position 72Ua, and an upper second position 72Ub by using the plurality of pieces of the measured three-dimensional coordinate data as illustrated in FIG. 8 (effective coordinate determining step S2). Here, the effective three-dimensional coordinate data are three-dimensional coordinate data of points on the lower flange surface 33L and the upper flange surface 33U including a virtual surface calculated in accordance with the plurality of pieces of the measured three-dimensional coordinate data received. These data are necessary for estimating the displacement amount of the lower flange surface 33L and the displacement amount of the upper flange surface 33U by changing from the open state to the fastened state. A method for determining the effective three-dimensional coordinate data will be described in detail later.

Here, the lower first position 72La is a position that is coincident with a first representative position 74*a* of the first supported portion 35*a* in the horizontal direction on a virtual plane continuous with the lower flange surface 33L. The first representative position 74*a* is a position to which the largest load is applied in the first supported portion 35*a*. The lower second position 72Lb is a position that is coincident with a second representative position 74*b* of the second supported portion 35*b* in the horizontal direction on a virtual plane continuous with the lower flange surface 33L. The second representative position 74*b* is a position to which the largest load is applied in the second supported portion 35*b*. The plurality of lower target positions 71L are positions on the lower flange surface 33L from which displacement amounts in the vertical direction Dz when the casing 30 changes from the open state to the fastened state are to be obtained. Here, the positions on the lower flange surface 33L from which the displacement amounts in the vertical direction Dz are to be obtained are locations on the lower flange surface 33L at which the stationary component storage portions 36 are formed in the axial direction Dy, and are located at inner side edges of the lower flange surface 33L. The upper first position 72Ua is a position that is coincident with the first representative position 74*a* of the first supported portion 35*a* in the horizontal direction on a surface continuous with the upper flange surface 33U. The upper second position 72Ub is a position that is coincident with the second representative position 74*b* of the second supported portion 35*b* in the horizontal direction on a surface continuous with the upper flange surface 33U. The plurality of upper target positions 71U are positions on the upper flange surface 33U from which displacement amounts in the vertical direction Dz when the casing 30 changes from the open state to the fastened state are to be obtained. Here, the positions on the upper flange surface 33U from which the displacement amounts in the vertical direction Dz are to be obtained are locations on the upper flange surface 33U at which the stationary component storage portions 36 are formed in the axial direction Dy, and are located at inner side edges of the upper flange surface 33U.

Each of the plurality of upper target positions 71U is positionally coincident with one lower target position 71L included in the plurality of lower target positions 71L in the horizontal direction. Here, being positionally coincident in the horizontal direction means not only that coordinate values indicating positions in the axial direction Dy are the same and coordinate values indicating positions in the lateral direction Dx are also the same, but also that coordinate values indicating positions in the axial direction Dy are substantially the same and coordinate values indicating positions in the lateral direction Dx are also substantially the same.

Changes in the gaps in the radial direction Dr between the stationary components and the rotor 15 due to the deformation of the lower-half casing 30L and the upper-half casing 30U by changing from the open state to the fastened state are dominant over the deformation in the positions on the lower flange surface 33L at which the stationary component storage portions 36 are formed in the axial direction Dy and which are located at the inner side edges of the lower flange surface 33L and the deformation in the positions on the upper flange surface 33U at which the stationary component storage portions 36 are formed in the axial direction Dy and which are located at the inner side edges on the upper flange surface 33U. For this reason, the lower target positions 71L from which the displacement amounts in the vertical direction Dz are to be obtained are set to the above-described positions, and the upper target positions 71U from which the displacement amounts in the vertical direction Dz are to be obtained are set to the above-described positions.

Note that each of the lower target positions 71L does not necessarily need to be located at an inner side edge of the lower flange surface 33L, and may be located at, for example, any position within a range from the inner side edge of the lower flange surface 33L to a position corresponding to one third of a flange width in a flange width direction. Similarly, each of the upper target positions 71U does not necessarily need to be located at an inner side edge of the upper flange surface 33U, and may be located at, for example, any position within a range from the inner side edge of the upper flange surface 33U to a position corresponding to one third of a flange width in a flange width direction.

Figure 9:
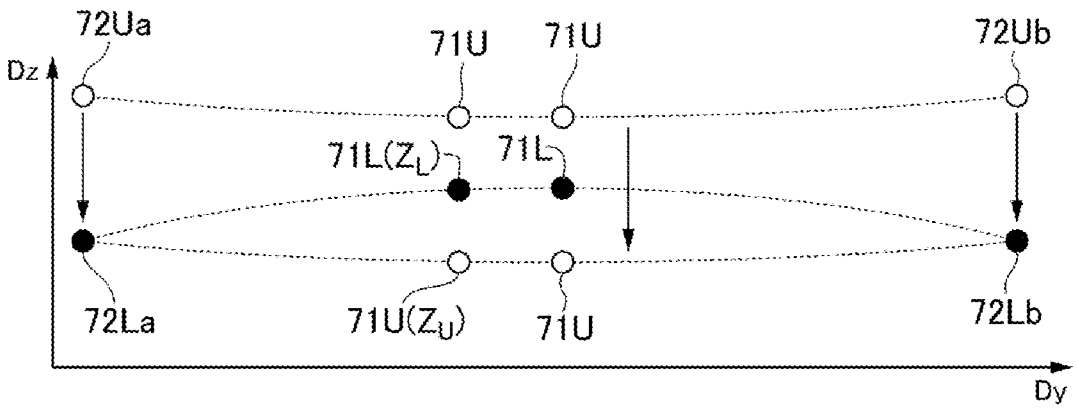
FIG. 9 is an explanatory diagram illustrating a processing content in a coordinate change step in the embodiment according to the present disclosure.

Next, the coordinate change unit 63 of the device for estimating a flange displacement amount 50 changes the effective three-dimensional coordinate data determined by the effective coordinate determining unit 62 (coordinate change step S3). More specifically, as illustrated in FIG. 9, the coordinate change unit 63 changes the effective three-dimensional coordinate data determined by the effective coordinate determining unit 62 by coordinate conversion such as parallel translation and/or rotational transfer such that the effective three-dimensional coordinate data at the lower first position 72La matches the effective three-dimensional coordinate data at the upper first position 72Ua and that the effective three-dimensional coordinate data at the lower second position 72Lb matches the effective three-dimensional coordinate data at the upper second position 72Ub.

Next, the displacement amount calculation unit 64 of the device for estimating a flange displacement amount 50 calculates the displacement amounts in the vertical direction Dz of the lower target positions 71L on the lower flange 32L and the displacement amounts in the vertical direction Dz of the upper target positions 71U on the upper flange 32U by using the effective three-dimensional coordinate data coordinate-changed by the coordinate change unit 63, and outputs these displacement amounts in response to a request from the outside (displacement amount calculation step S4). Specifically, the displacement amount calculation unit 64 uses, as a displacement amount Zd of the lower target position 71L in the vertical direction Dz and the upper target position 71U in the vertical direction Dz one-half of the difference between a coordinate value ZL in the vertical direction Dz included in the effective three-dimensional coordinate data at the lower target position 71L after the coordinate change and a coordinate value ZU in the vertical direction Dz included in the effective three-dimensional coordinate data at the upper target position 71U after the coordinate change as indicated by the following equation.

$$Zd = (ZL - ZU)/2$$

This is the end of the estimation of the displacement amounts in the vertical direction Dz at the lower target positions 71L of the lower flange 32L and the displacement amounts in the vertical direction Dz at the lower target positions 71L of the upper target positions 71U by the device for estimating a flange displacement amount 50.

Next, a plurality of types of methods for determining effective three-dimensional coordinate data in the effective coordinate determining unit 62 will be described.

First Determining Method

In the first determining method, the first processing unit 62*a* of the effective coordinate determining unit 62 performs the first processing step S2*a* and the second processing unit 62*b* of the effective coordinate determining unit 62 performs the second processing step S2*b* to determine the effective three-dimensional coordinate data at the lower first position 72La, the lower second position 72Lb, the plurality of lower target positions 71L, the upper first position 72Ua, the upper second position 72Ub, and the plurality of upper target positions 71U.

In the first processing step S2*a*, the first processing unit 62*a* of the effective coordinate determining unit 62 determines the effective three-dimensional coordinate data at the plurality of lower target positions 71L, a lower edge first position 73La, a lower edge second position 73Lb, the plurality of upper target positions 71U, an upper edge first position 73Ua, and an upper edge second position 73Ub as illustrated in FIG. 8. Here, the lower edge first position 73La is a position on the lower flange surface 33L located at the boundary with the first supported portion 35*a*. The lower edge second position 73Lb is a position on the lower flange surface 33L located at the boundary with the second supported portion 35*b*. The upper edge first position 73Ua is a position on the upper flange surface 33U which is coincident with the lower edge first position 73La in the horizontal direction. The upper edge second position 73Ub is a position on the upper flange surface 33U which is coincident with the lower edge second position 73Lb in the horizontal direction.

When the first determining method is performed in the effective coordinate determining step S2, the measured three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub are received in the measured coordinate receiving step S1. In the effective coordinate determining step S2, the first processing unit 62*a* uses the measured three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub received in the measured coordinate receiving step S1 as the effective three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub as is.

The effective coordinate determining unit 62 can obtain, from the reference three-dimensional shape data 58*d* stored in the auxiliary storage device 58, three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub when the reference three-dimensional shape data 58*d* is created. Then, the effective coordinate determining unit 62 recognizes the measured three-dimensional coordinate data of one lower target position 71L from among the measured three-dimensional coordinate data at the plurality of positions received by the measured coordinate receiving unit 61, for example, in the following manner. The effective coordinate determining unit 62 extracts, from the measured three-dimensional coordinate data at the plurality of positions received by the measured coordinate receiving unit 61, measured three-dimensional coordinate data that matches three-dimensional coordinate data of the one lower target position 71L indicated by the reference three-dimensional shape data 58*d* in terms of coordinate values in the horizontal direction, and recognizes the extracted measured three-dimensional coordinate data as the measured three-dimensional coordinate data of the one lower target position 71L.

In the second processing step S2*b*, the second processing unit 62*b* of the effective coordinate determining unit 62 estimates effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62*b* estimates effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub.

Figure 10:
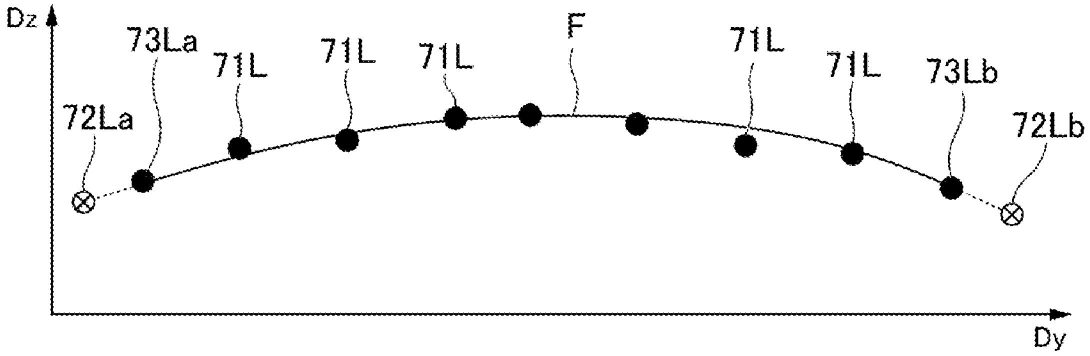
FIG. 10 is an explanatory diagram illustrating a processing content in a second processing step in the embodiment according to the present disclosure.

When estimating the effective three-dimensional coordinate data at the lower first position 72La and the lower second position 72Lb, the second processing unit 62*b* uses the effective three-dimensional coordinate data at the plurality of lower target positions 71L, the lower edge first position 73La, and the lower edge second position 73Lb to obtain a high-order function F, such as a quadratic function, that approximates a surface shape of the lower flange surface 33L as illustrated in FIG. 10. The second processing unit 62*b* uses the high-order function F to obtain a coordinate value in the vertical direction Dz corresponding to a coordinate value in the horizontal direction of the lower first position 72La indicated by the reference three-dimensional shape data 58*d* by extrapolation. Then, the second processing unit 62*b* replaces a coordinate value in the vertical direction Dz among coordinate values in the respective directions relating to the lower first position 72La indicated by the reference three-dimensional shape data 58*d* with the obtained coordinate value in the vertical direction Dz, and uses the data after the replacement as the effective three-dimensional coordinate data of the lower first position 72La. Further, the second processing unit 62*b* uses the high-order function F to obtain a coordinate value in the vertical direction Dz corresponding to a coordinate value in the horizontal direction of the lower second position 72Lb indicated by the reference three-dimensional shape data 58*d*. Then, the second processing unit 62*b* replaces a coordinate value in the vertical direction Dz among coordinate values in the respective directions relating to the lower second position 72Lb indicated by the reference three-dimensional shape data 58*d* with the obtained coordinate value in the vertical direction Dz, and uses the data after the replacement as the effective three-dimensional coordinate data of the lower second position 72Lb. The second processing unit 62*b* obtains effective three-dimensional coordinate data of the upper first position 72Ua and the upper second position 72Ub in the same manner as described above.

Figure 11:
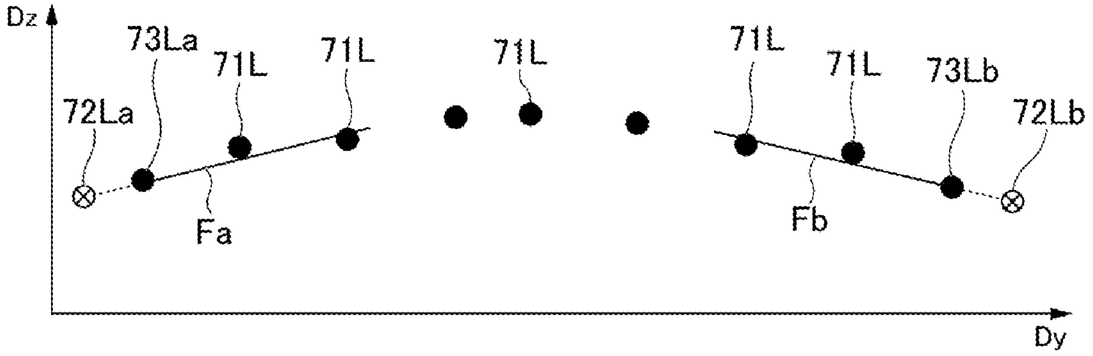
FIG. 11 is an explanatory diagram illustrating another processing content in the second processing step in the embodiment according to the present disclosure.

In the above description, the surface shapes of the lower flange surface 33L and the upper flange surface 33U are approximated by the high-order function F. However, as illustrated in FIG. 11, the surface shape of a part of the lower flange surface 33L or the surface shape of a part of the upper flange surface 33U may be approximated by a linear function. In that case, the second processing unit 62*b* approximates the surface shape of the lower flange surface 33L near the lower edge first position 73La by a linear function Fa by using the effective three-dimensional coordinate data at a plurality of lower target positions 71L close to the lower edge first position 73La among the plurality of lower target positions 71L and the effective three-dimensional coordinate data at the lower edge first position 73La. Then, the coordinate value of the lower first position 72La in the vertical direction Dz is obtained by using the linear function Fa. Further, the second processing unit 62*b* approximates the surface shape of the lower flange surface 33L near the lower edge second position 73Lb by a linear function Fb by using the effective three-dimensional coordinate data at a plurality of lower target positions 71L close to the lower edge second position 73Lb among the plurality of lower target positions 71L and the effective three-dimensional coordinate data at the lower edge second position 73Lb. Then, the coordinate value of the lower second position 72Lb in the vertical direction Dz is obtained by using the linear function Fb.

In this manner, the effective three-dimensional coordinate data at the lower first position 72La, the lower second position 72Lb, the plurality of lower target positions 71L, the upper first position 72Ua, the upper second position 72Ub, and the plurality of upper target positions 71U are determined.

As described above, in the first determining method, the number of pieces of three-dimensional coordinate data to be handled can be reduced, and thus the time and effort for an operator to measure three-dimensional coordinate values and the calculation load on a computer can be reduced.

Figure 12:
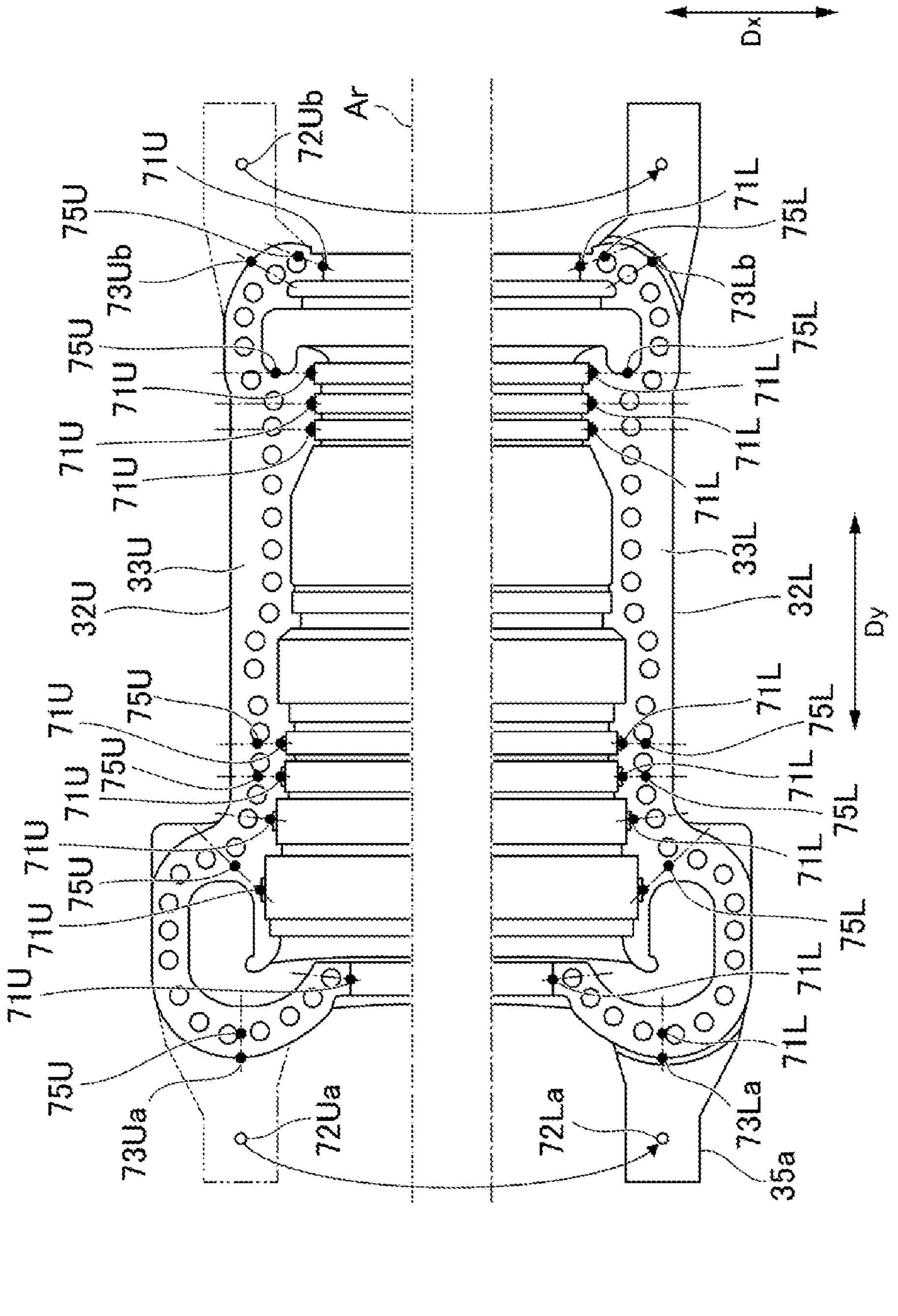
FIG. 12 is an explanatory diagram illustrating positions of measured three-dimensional coordinate data necessary for executing a first determining method in the embodiment according to the present disclosure.

In the above description, the second processing unit 62*b* estimates the effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62*b* estimates the effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub. However, in the second processing step S2*b*, when the effective three-dimensional coordinate data at the lower first position 72La and the lower second position 72Lb are estimated, effective three-dimensional coordinate data at a plurality of lower width direction representative positions 75L may be used instead of the effective three-dimensional coordinate data at the plurality of lower target positions 71L as illustrated in FIG. 12. In addition, when the effective three-dimensional coordinate data at the upper first position 72Ua and the upper second position 72Ub are estimated, effective three-dimensional coordinate data at a plurality of upper width direction representative positions 75U may be used instead of the effective three-dimensional coordinate data at the plurality of upper target positions 71U.

Here, the lower width direction representative position 75L is a predetermined position in the axial direction Dy and is a center position in a flange width direction Dw on the lower flange surface 33L. The upper width direction representative position 75U is a predetermined position in the axial direction Dy and is a center position in the flange width direction Dw on the upper flange surface 33U. The flange width direction Dw is a direction connecting an outer edge and an inner edge of a flange surface along the flange surface, and is a direction in which a distance from a predetermined position to the outer edge or the inner edge of the flange surface is shortest. The predetermined position on the lower flange surface 33L is the lower target position 71L, and the predetermined position on the upper flange surface 33U is the upper target position 71U.

In the measured coordinate receiving step S1, measured three-dimensional coordinate data at the plurality of lower width direction representative positions 75L and the plurality of upper width direction representative positions 75U are received. In the first processing step S2*a* of the effective coordinate determining step S2, the measured three-dimensional coordinate data at the plurality of lower width direction representative positions 75L and the plurality of upper width direction representative positions 75U are used as effective three-dimensional coordinate data at the plurality of lower width direction representative positions 75L and the plurality of upper width direction representative positions 75U as is. In the second processing step S2*b*, when the effective three-dimensional coordinate data at the lower first position 72La and the lower second position 72Lb are estimated, the effective three-dimensional coordinate data at the plurality of lower width direction representative positions 75L are used as described above. In addition, in the second processing step S2*b*, when the effective three-dimensional coordinate data at the upper first position 72Ua and the upper second position 72Ub are estimated, the effective three-dimensional coordinate data at the plurality of upper width direction representative positions 75U are used.

A change tendency of the effective three-dimensional coordinate data at the lower edge first position 73La, the lower edge second position 73Lb, and the lower width direction representative positions 75L reflects the three-dimensional coordinate data at the lower first position 72La and the lower second position 72Lb more accurately than, for example, a change tendency of the three-dimensional coordinate data at the lower edge first position 73La, the lower edge second position 73Lb, and the inner side edges of the lower flange surface 33L, or a change tendency of the three-dimensional coordinate data at the lower edge first position 73La, the lower edge second position 73Lb, and outer side edges of the lower flange surface 33L. Thus, in order to increase the accuracy of estimating the three-dimensional coordinate data at the lower first position 72La and the lower second position 72Lb, it is preferable to estimate the lower first position 72La and the lower second position 72Lb from the change tendency of the effective three-dimensional coordinate data at the lower edge first position 73La, the lower edge second position 73Lb, and the lower width direction representative positions 75L.

On the other hand, a change tendency of the effective three-dimensional coordinate data at the upper edge first position 73Ua, the upper edge second position 73Ub, and the upper width direction representative positions 75U reflects the three-dimensional coordinate data at the upper first position 72Ua and the upper second position 72Ub more accurately than, for example, a change tendency of the three-dimensional coordinate data at the upper edge first position 73Ua, the upper edge second position 73Ub, and the inner side edges of the upper flange surface 33U, or a change tendency of the three-dimensional coordinate data at the upper edge first position 73Ua, the upper edge second position 73Ub, and outer side edges of the upper flange surface 33U. Thus, in order to increase the accuracy of estimating the three-dimensional coordinate data at the upper first position 72Ua and the upper second position 72Ub, it is preferable to estimate the upper first position 72Ua and the upper second position 72Ub from the change tendency of the effective three-dimensional coordinate data at the upper edge first position 73Ua, the upper edge second position 73Ub, and the upper width direction representative positions 75U.

Second Determining Method

Similar to the first determining method, in the second determining method, and also in a third determining method and a fourth determining method to be described below; the first processing unit 62*a* of the effective coordinate determining unit 62 performs the first processing step S2*a* and the second processing unit 62*b* of the effective coordinate determining unit 62 performs the second processing step S2*b*. In the second processing steps S2*b* of the second determining method, the third determining method, and the fourth determining method, substantially the same processing as in the second processing step S2*b* of the first determining method is performed. Therefore, the first processing step S2*a* will be mainly described below.

Figure 13:
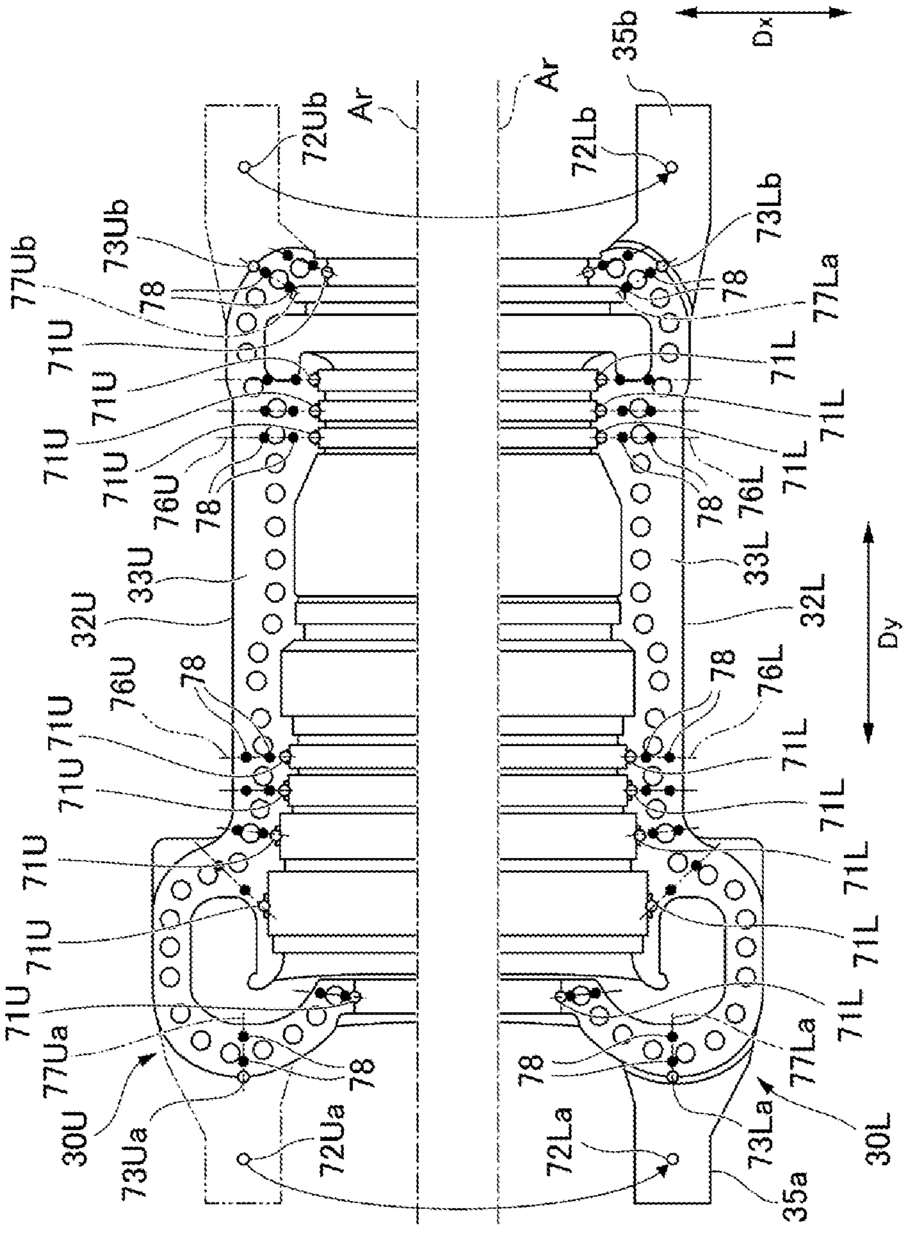
FIG. 13 is an explanatory diagram illustrating positions of measured three-dimensional coordinate data necessary for executing a second determining method in the embodiment according to the present disclosure.

When the second determining method is performed in the effective coordinate determining step S2, measured three-dimensional coordinate data at the following positions illustrated in FIG. 13 are received in the measured coordinate receiving step S1.

a. Measured three-dimensional coordinate data at a plurality of positions 78 on a lower virtual line 76L passing through the lower target position 71L and extending in the flange width direction for each of the plurality of lower target positions 71L b. Measured three-dimensional coordinate data at a plurality of positions 78 on an upper virtual line 76U passing through the upper target position 71U and extending in the flange width direction for each of the plurality of upper target positions 71U c. Measured three-dimensional coordinate data at a plurality of positions 78 on a lower first virtual line 77La passing through the lower edge first position 73La and extending in the flange width direction d. Measured three-dimensional coordinate data at a plurality of positions 78 on a lower second virtual line 77Lb passing through the lower edge second position 73Lb and extending in the flange width direction e. Measured three-dimensional coordinate data at a plurality of positions 78 on an upper first virtual line 77Ua passing through the upper edge first position 73Ua and extending in the flange width direction f. Measured three-dimensional coordinate data at a plurality of positions 78 on an upper second virtual line 77Ub passing through the upper edge second position 73Ub and extending in the flange width direction Here, the flange width direction is a direction connecting an outer edge and an inner edge of a flange surface along the flange surface, and is a direction in which a distance from a reference position to the outer edge or the inner edge of the flange surface is shortest. The reference position is each of the upper target position 71U, the lower target position 71L, the lower edge first position 73La, the lower edge second position 73Lb, the upper edge first position 73Ua, and the upper edge second position 73Ub. The number of positions on the virtual line whose measured three-dimensional coordinate data are received in the measured coordinate receiving step S1 is, for example, 2 or more and less than 10.

In the first processing step S2*a* in the second determining method, the first processing unit 62*a* of the effective coordinate determining unit 62 determines the effective three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub by using a plurality of pieces of the measured three-dimensional coordinate data received in the measured coordinate receiving step S1. That is, the first processing unit 62*a* determines the effective three-dimensional coordinate data at all the reference positions described above.

Figure 14:
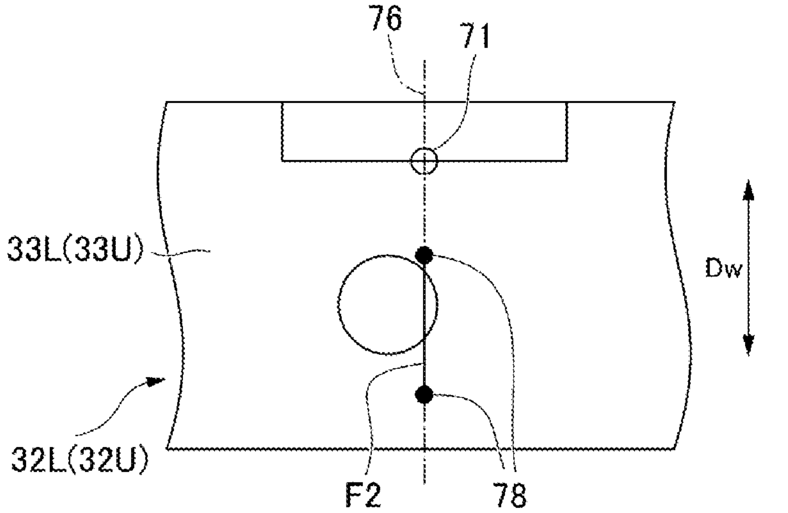
FIG. 14 is an explanatory diagram illustrating a processing content in a first processing step S2*a* in the case of executing the second determining method in the embodiment according to the present disclosure.

As illustrated in FIG. 14, the first processing unit 62*a* uses measured three-dimensional coordinate data at a plurality of positions 78 on a virtual line 76 passing through a reference position 71 and extending in the flange width direction Dw to obtain a function F2 that approximates coordinate values in the vertical direction Dz at the plurality of positions 78 on the virtual line 76. The first processing unit 62*a* uses the function F2 to obtain a coordinate value in the vertical direction Dz at the reference position 71 by extrapolation. Then, the first processing unit 62*a* replaces a coordinate value in the vertical direction Dz among coordinate values in the respective directions relating to the reference position 71 indicated by the reference three-dimensional shape data 58*d* with the obtained coordinate value in the vertical direction Dz, and uses the data after the replacement as the effective three-dimensional coordinate data of the reference position 71.

Similar to the second processing step S2*b* in the first determining method, in the second processing step S2*b* in the second determining method, the second processing unit 62*b* of the effective coordinate determining unit 62 estimates effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62*b* estimates effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub.

In this manner, the effective three-dimensional coordinate data at the lower first position 72La, the lower second position 72Lb, the plurality of lower target positions 71L, the upper first position 72Ua, the upper second position 72Ub, and the plurality of upper target positions 71U are determined.

In the first determining method, the measured three-dimensional coordinate data at the reference position is used as the effective three-dimensional coordinate data of the reference position as is. Thus, the effective three-dimensional coordinate data at the reference position is likely to be affected by a local shape change, and may include a large measurement error. For example, when the three-dimensional shape measuring device 69 is a three-dimensional laser measuring device, the three-dimensional position data measured by the three-dimensional laser measuring device will include an error when there is a minute floating object between a measurement target and the three-dimensional laser measuring device. On the other hand, in the second determining method, three-dimensional coordinate data of the reference position 71 is estimated in accordance with measured three-dimensional coordinate data at a plurality of positions, and the estimated three-dimensional coordinate data is used as effective three-dimensional coordinate data. Thus, the second determining method is less likely to be affected by a local shape change than the first determining method, and can reduce the possibility of including a large measurement error.

In the above description, when estimating the effective three-dimensional coordinate data at the lower first position 72La and the lower second position 72Lb, the second processing unit 62*b* uses the effective three-dimensional coordinate data at the plurality of lower target positions 71L. In addition, when estimating the effective three-dimensional coordinate data at the upper first position 72Ua and the upper second position 72Ub, the second processing unit 62*b* uses the effective three-dimensional coordinate data at the plurality of upper target positions 71U. However, also in the second determining method, as described in the first determining method, when the effective three-dimensional coordinate data at the lower first position 72La and the lower second position 72Lb are estimated in the second processing step S2*b*, the effective three-dimensional coordinate data at the plurality of lower width direction representative positions 75L may be used instead of the effective three-dimensional coordinate data at the plurality of lower target positions 71L. In addition, when the effective three-dimensional coordinate data at the upper first position 72Ua and the upper second position 72Ub are estimated, the effective three-dimensional coordinate data at the plurality of upper width direction representative positions 75U may be used.

In that case, the effective three-dimensional coordinate data at the lower width direction representative positions 75L and the upper width direction representative positions 75U are obtained by the first processing unit 62*a* using the function F2 used for obtaining the effective three-dimensional coordinate data at the reference positions 71.

Third Determining Method

Figure 15:
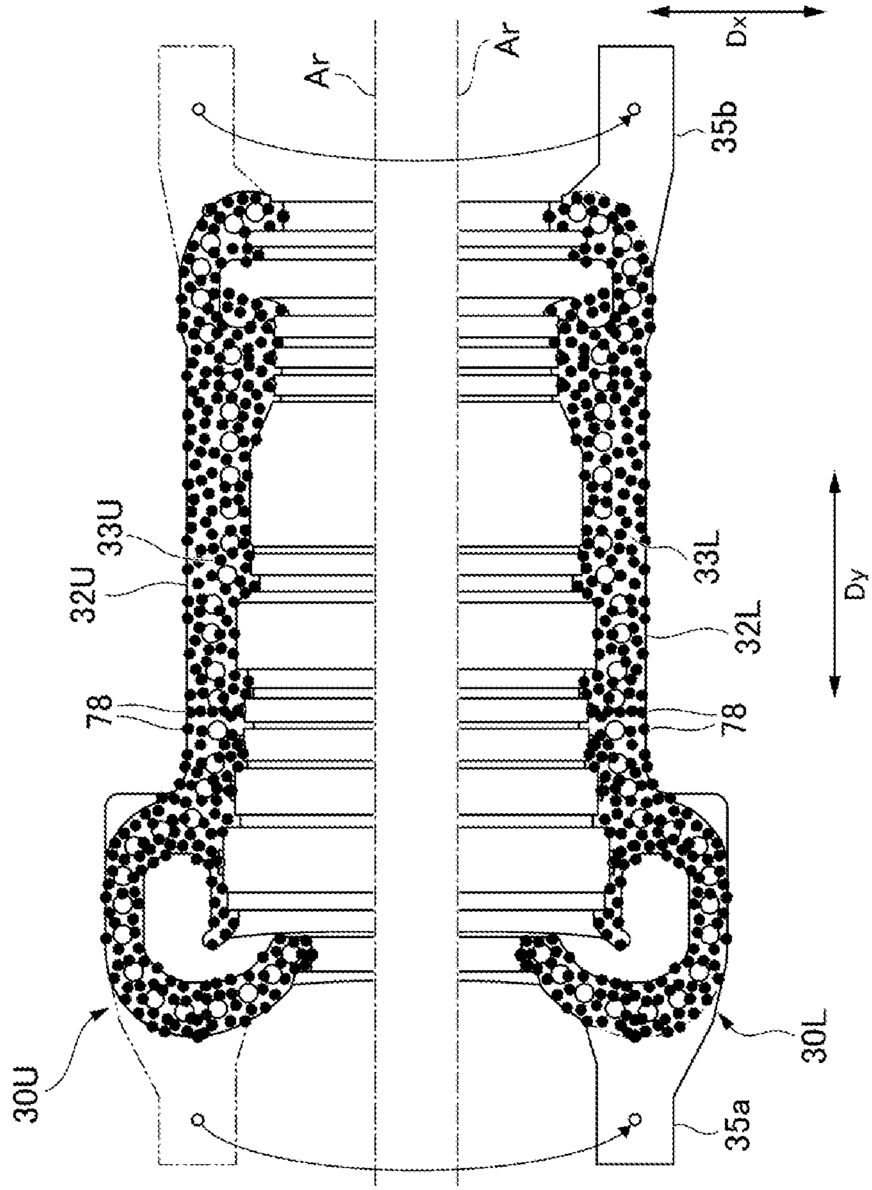
FIG. 15 is an explanatory diagram illustrating positions of measured three-dimensional coordinate data necessary for executing a third determining method in the embodiment according to the present disclosure.
Figure 16:
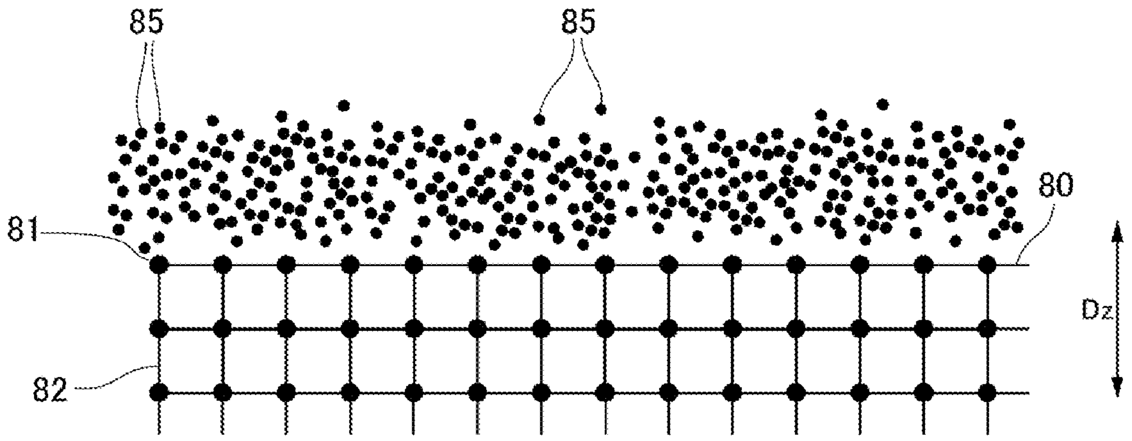
FIG. 16 is an image diagram illustrating a relative positional relationship between a flange surface indicated by reference three-dimensional shape data and points indicated by measured three-dimensional coordinate data at a plurality of positions on an actual flange surface in the case of executing the third determining method in the embodiment according to the present disclosure.

When the third determining method is performed in the effective coordinate determining step S2, measured three-dimensional coordinate data at a plurality of positions 78 over the entire lower flange surface 33L and measured three-dimensional coordinate data at a plurality of positions over the entire upper flange surface 33U are received in the measured coordinate receiving step S1 as illustrated in FIGS. 15 and 16. FIG. 16 is an image diagram illustrating the relative positional relationship between a flange surface 80 and reference positions 81 indicated by the reference three-dimensional shape data 58*d* and points 85 indicated by measured three-dimensional coordinate data at a plurality of positions over the entire actual flange surface.

Similar to the first processing steps S2*a* in the determining methods described above, also in the first processing step S2*a* in the third determining method, the first processing unit 62*a* of the effective coordinate determining unit 62 determines the effective three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub. That is, the first processing unit 62*a* determines the effective three-dimensional coordinate data at all the reference positions 71 described above.

Figure 17:
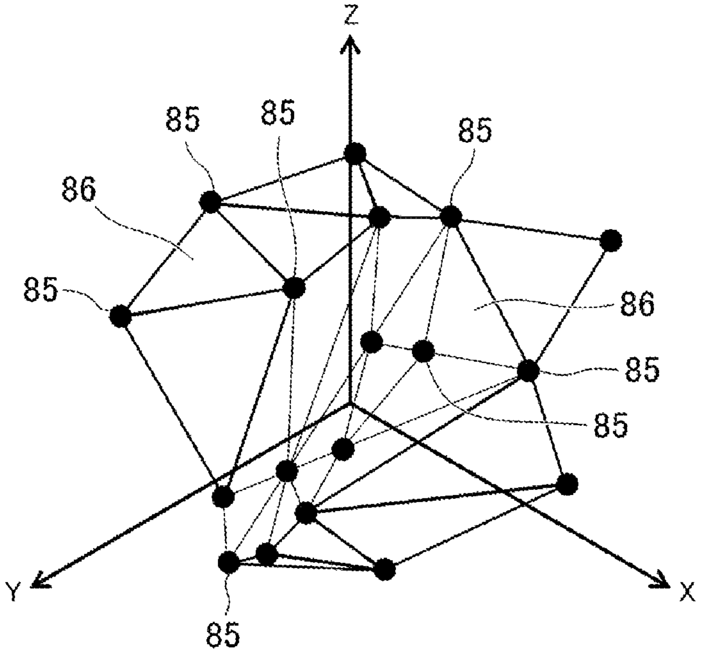
FIG. 17 is an explanatory diagram for describing a plurality of pieces of polygon data in the embodiment according to the present disclosure.

In the first processing step S2*a*, the first processing unit 62*a* first creates a plurality of pieces of polygon data by using the measured three-dimensional coordinate data at a plurality of positions over the entire flange surface as illustrated in FIG. 17. The polygon data is data that defines a polygonal plane. The first processing unit 62*a* connects, among the plurality of points 85 indicated by the measured three-dimensional coordinate data at the plurality of positions, a plurality of points 85 adjacent to each other with line segments. A polygonal plane surrounded by these line segments is referred to as a polygon 86.

Figure 18:
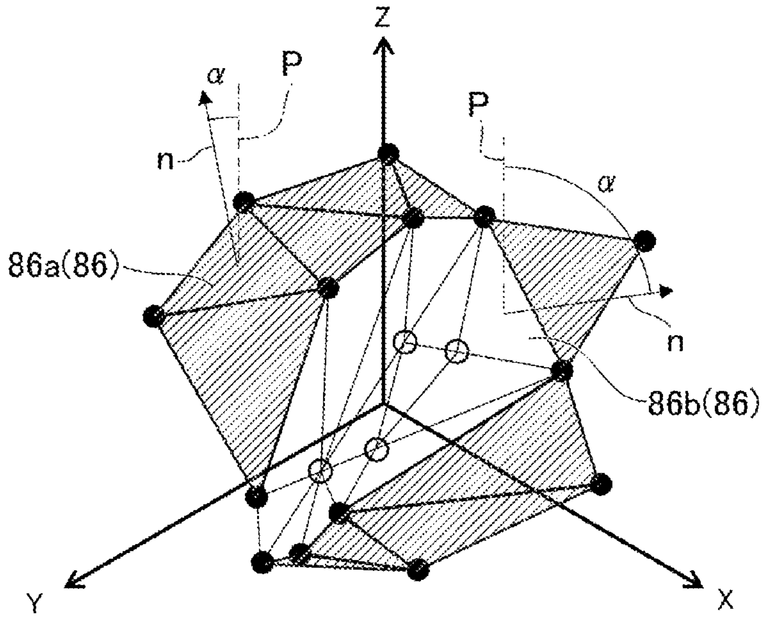
FIG. 18 is an explanatory diagram for describing extraction of a plurality of pieces of specific polygon data from the plurality of pieces of polygon data in the embodiment according to the present disclosure.

Subsequently, as illustrated in FIG. 18, the first processing unit 62*a* extracts, from among the plurality of pieces of polygon data, a plurality of pieces of polygon data that satisfy a certain condition. In FIG. 18, polygons 86*a* identified by the polygon data to be extracted are patterned, and polygons 86*b* identified by the polygon data not to be extracted are not patterned. Further, an XY plane in FIG. 18 is a plane parallel to the flange surface 80 indicated by the reference three-dimensional shape data 58*d*. Here, the condition described above is that an inclination of the polygon 86 identified by the polygon data with respect to the flange surface 80 indicated by the reference three-dimensional shape data 58*d* is within a predetermined inclination. The first processing unit 62*a* first obtains a normal line n of the polygon 86 for each of the plurality of polygons 86. Subsequently, the first processing unit 62*a* obtains an angle $\alpha$ between a perpendicular line p to the flange surface 80 indicated by the reference three-dimensional shape data 58*d* and the normal line n of the polygon 86 for each of the plurality of polygons 86. Then, the first processing unit 62*a* extracts, from among the plurality of pieces of polygon data, a plurality of pieces of polygon data in which the angle $\alpha$ between the perpendicular line p to the flange surface 80 and the normal line n of the polygon 86 is within a predetermined angle (predetermined inclination).

Figure 19:
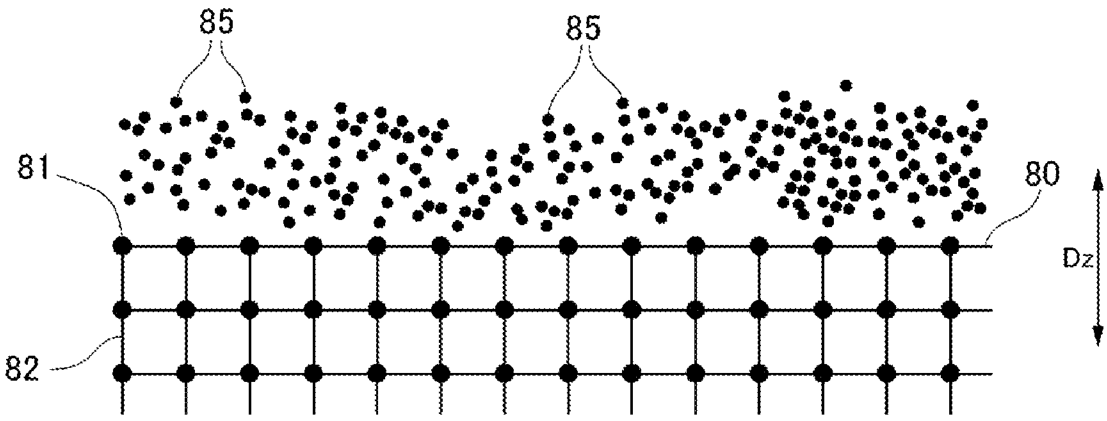
FIG. 19 is an image diagram illustrating a relative positional relationship between the flange surface indicated by the reference three-dimensional shape data and points indicated by measured three-dimensional coordinate data at a plurality of positions after the extraction of the polygon data out of the plurality of positions on the actual flange surface in the case of executing the third determining method in the embodiment according to the present disclosure.

This data extraction processing is performed to exclude, from the measured three-dimensional coordinate data at the plurality of points 85 received in the measured coordinate receiving step S1, measured three-dimensional coordinate data at points on a wall of an edge of the flange surface and points on the inside surfaces of the bolt holes 34 extending through the flange surface. Thus, as illustrated in FIG. 19, the number of the points 85 after the extraction processing is less than the number of the points 85 before the extraction processing. In particular, the number of the points 85 after the extraction processing is significantly less than the number of the points 85 before the extraction processing in regard to a surface 82 that is inclined with respect to the flange surface 80 in a reference shape model indicated by the reference three-dimensional shape data 58*d*.

Figure 20:
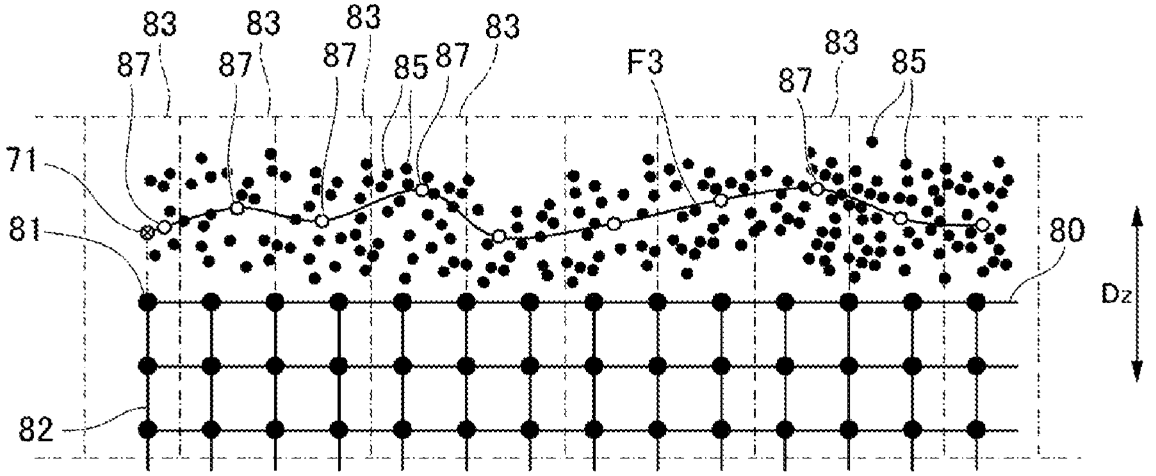
FIG. 20 is an explanatory diagram illustrating a method for obtaining a reference position in the first processing step in the case of executing the third determining method in the embodiment according to the present disclosure.

Next, as illustrated in FIG. 20, the first processing unit 62*a* divides a virtual three-dimensional space including the flange surface 80 into a plurality of three-dimensional blocks 83. Then, the first processing unit 62*a* sets a representative point 87 in a target three-dimensional block 83 for each of the plurality of three-dimensional blocks 83. Specifically, the first processing unit 62*a* selects, from among the plurality of points 85 included in the polygons 86*a* identified by the plurality of pieces of polygon data extracted in the extraction processing, a point that is a median of the plurality of points 85 included in the target three-dimensional block 83 as the representative point 87 in the target three-dimensional block 83.

The representative point 87 may be determined by robust estimation or bi-weight estimation based on the Lorentz distribution of the plurality of points 85 included in the polygons 86*a* identified by the plurality of pieces of polygon data extracted in the extraction processing.

The first processing unit 62*a* connects the respective representative points 87 of the plurality of three-dimensional blocks 83 to each other with a plane or a curved surface as a complementary surface to create surface shape data of the complementary surface including the respective representative points 87 of the plurality of three-dimensional blocks 83. The surface shape data is represented by a function F3 indicating the shape of the entire flange surface. The effective coordinate determining unit 62 obtains effective three-dimensional coordinate data at the reference positions 71 by using the surface shape data of the entire flange surface represented by the function F3.

Similar to the second processing steps S2*b* in the first determining method and the second determining method, also in the second processing step S2*b* in the third determining method, the second processing unit 62*b* of the effective coordinate determining unit 62 estimates effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62*b* estimates effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub.

In this manner, the effective three-dimensional coordinate data at the lower first position 72La, the lower second position 72Lb, the plurality of lower target positions 71L, the upper first position 72Ua, the upper second position 72Ub, and the plurality of upper target positions 71U are determined.

The third determining method is less likely to be affected by a local shape change than the second determining method and can reduce the possibility of including a large measurement error. Further, in the third determining method, the effective three-dimensional coordinate data at the reference position can be determined even when there is a wide range of data deficiency due to an obstacle or the like.

In the above description, when estimating the effective three-dimensional coordinate data at the lower first position 72La and the lower second position 72Lb, the second processing unit 62*b* uses the effective three-dimensional coordinate data at the plurality of lower target positions 71L. In addition, when estimating the effective three-dimensional coordinate data at the upper first position 72Ua and the upper second position 72Ub, the second processing unit 62*b* uses the effective three-dimensional coordinate data at the plurality of upper target positions 71U. However, also in the third determining method, as described in the first determining method and the second determining method, when the effective three-dimensional coordinate data at the lower first position 72La and the lower second position 72Lb are estimated in the second processing step S2*b*, the effective three-dimensional coordinate data at the plurality of lower width direction representative positions 75L may be used instead of the effective three-dimensional coordinate data at the plurality of lower target positions 71L. In addition, when the effective three-dimensional coordinate data at the upper first position 72Ua and the upper second position 72Ub are estimated, the effective three-dimensional coordinate data at the plurality of upper width direction representative positions 75U may be used.

In that case, the effective three-dimensional coordinate data at the lower width direction representative positions 75L and the upper width direction representative positions 75U are obtained by the first processing unit 62*a* using the function F3 used for obtaining the effective three-dimensional coordinate data at the reference positions 71.

Fourth Determining Method

Figure 21:
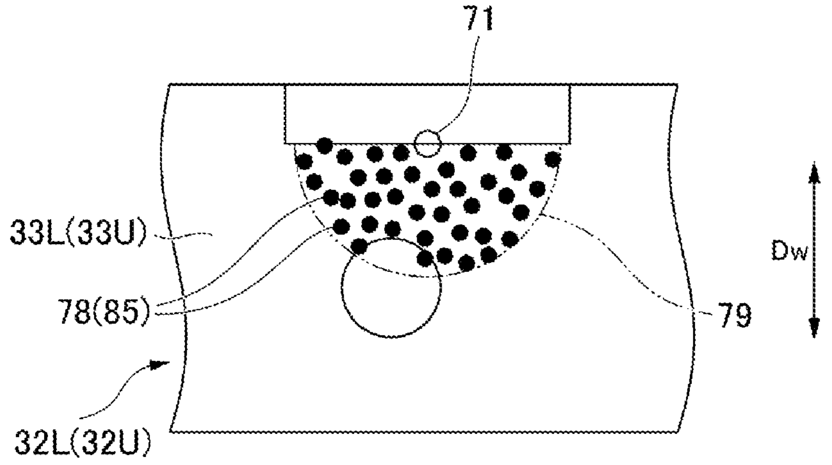
FIG. 21 is an explanatory diagram illustrating positions of measured three-dimensional coordinate data necessary for executing a fourth determining method in the embodiment according to the present disclosure.
Figure 22:
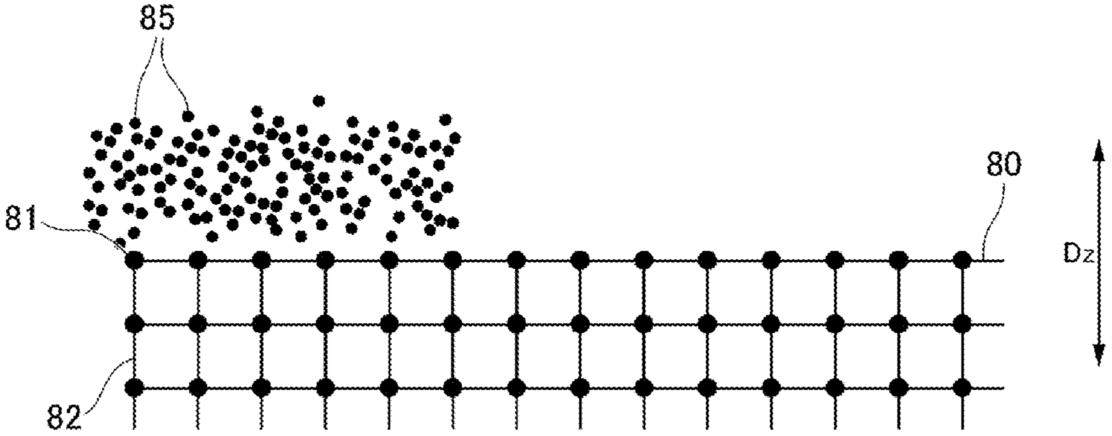
FIG. 22 is an image diagram illustrating a relative positional relationship between the flange surface indicated by the reference three-dimensional shape data and points indicated by measured three-dimensional coordinate data at the plurality of positions on the actual flange surface in the case of executing the fourth determining method in the embodiment according to the present disclosure.

When the fourth determining method is performed in the effective coordinate determining step S2, measured three-dimensional coordinate data at a plurality of positions 78 in a reference measurement region 79 including the above-described reference position 71 on the flange surface are received in the measured coordinate receiving step S1 as illustrated in FIGS. 21 and 22. FIG. 22 is an image diagram illustrating the relative positional relationship between the flange surface 80 indicated by the reference three-dimensional shape data 58*d* and points 85 indicated by the measured three-dimensional coordinate data at the plurality of positions in the reference measurement region 79 on the actual flange surface. Here, as illustrated in FIG. 21, the reference measurement region 79 is, for example, a region within a distance range of 1/20 to 1/2 of the flange width at the reference position 71 with the reference position 71 as a starting point. Thus, the reference measurement region 79 is also a lower measurement region including the lower target position 71L on the lower flange surface 33L, and is also an upper measurement region including the upper target position 71U on the upper flange surface 33U. The number of pieces of the measured three-dimensional coordinate data in the reference measurement region 79 received in the measured coordinate receiving step S1 is, for example, 10 or more. Thus, the number of pieces of the measured three-dimensional coordinate data in the reference measurement region 79 received in the measured coordinate receiving step S1 of the fourth determining method is larger than the number of pieces of the measured three-dimensional coordinate data on the positions on the virtual line received in the measured coordinate receiving step S1 of the second determining method.

Similar to the first processing steps S2*a* in the determining methods described above, also in the first processing step S2*a* in the fourth determining method, the first processing unit 62*a* of the effective coordinate determining unit 62 determines the effective three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub. That is, the first processing unit 62*a* determines the effective three-dimensional coordinate data at all the reference positions 71 described above.

Figure 23:
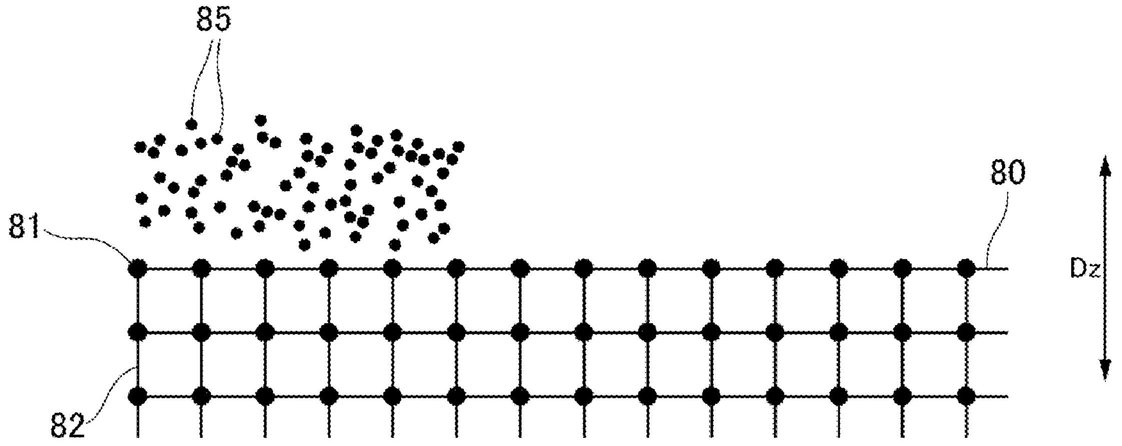
FIG. 23 is an image diagram illustrating a relative positional relationship between the flange surface indicated by the reference three-dimensional shape data and points indicated by measured three-dimensional coordinate data at a plurality of positions after the extraction of the polygon data out of the plurality of positions on the actual flange surface in the case of executing the fourth determining method in the embodiment according to the present disclosure.

In this first processing step S2*a*, similar to the first processing step S2*a* in the third determining method, the first processing unit 62*a* first creates a plurality of pieces of polygon data using the measured three-dimensional coordinate data at the plurality of positions 78, and extracts, from among the plurality of pieces of polygon data, a plurality of pieces of polygon data that satisfy a certain condition. As a result, as illustrated in FIG. 23, the number of the points 85 indicated by the measured three-dimensional coordinate data after the extraction processing is less than the number of the points 85 before the extraction processing.

Figure 24:
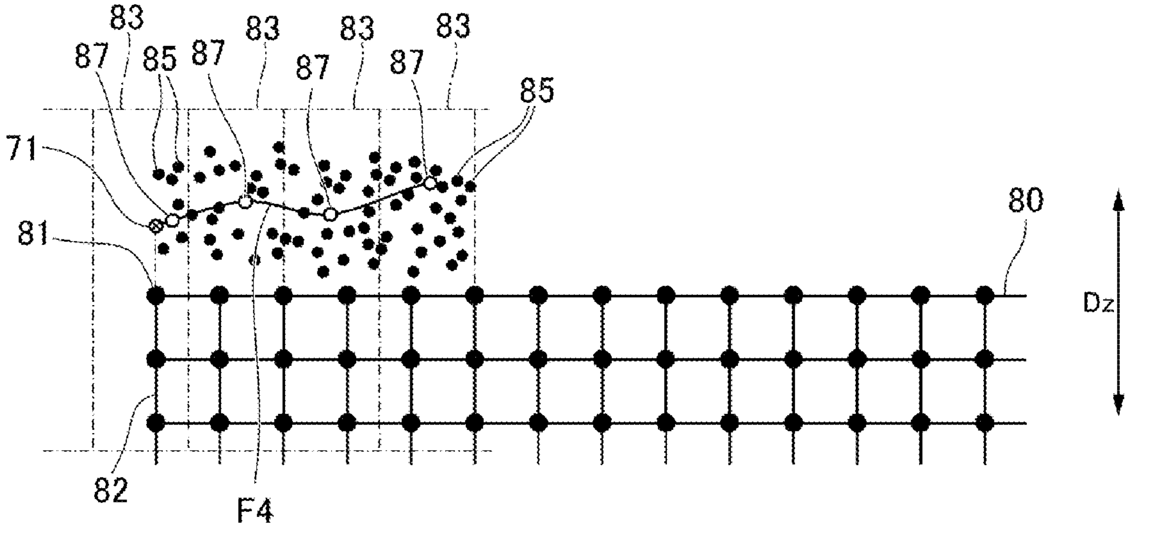
FIG. 24 is an explanatory diagram illustrating a method for obtaining a reference position in the first processing step in the case of executing the fourth determining method in the embodiment according to the present disclosure.

Next, similar to the first processing step S2*a* in the third determining method, the first processing unit 62*a* divides a virtual three-dimensional space including the flange surface 80 into a plurality of three-dimensional blocks 83 as illustrated in FIG. 24. Then, the first processing unit 62*a* determines a representative point 87 in a target three-dimensional block 83 for each of the plurality of three-dimensional blocks 83.

The first processing unit 62*a* connects the respective representative points 87 of the plurality of three-dimensional blocks 83 to each other with a plane or a curved surface as a complementary surface to create the surface shape data of the complementary surface including the respective representative points 87 of the plurality of three-dimensional blocks 83. The surface shape data is represented by a function F4 indicating the shape of the flange surface in the reference measurement region 79. The first processing unit 62*a* obtains effective three-dimensional coordinate data at the reference position 71 by using the surface shape data represented by the function F4.

Similar to the second processing steps S2*b* in the first determining method and the second determining method, in the second processing step S2*b* in the fourth determining method, the second processing unit 62*b* of the effective coordinate determining unit 62 estimates effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62*b* estimates effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub.

In this manner, the effective three-dimensional coordinate data at the lower first position 72La, the lower second position 72Lb, the plurality of lower target positions 71L, the upper first position 72Ua, the upper second position 72Ub, and the plurality of upper target positions 71U are determined.

The fourth determining method is less likely to be affected by a local shape change than the second determining method and can reduce the possibility of including a large measurement error. Further, in the fourth determining method, effective three-dimensional coordinate data at the reference position can be determined even when there is a wide range of data deficiency due to an obstacle or the like.

In the above description, the effective three-dimensional coordinate data at the reference position 71 is obtained by using the surface shape data of the flange surface in the reference measurement region 79. However, instead of creating the surface shape data, a coordinate value in the vertical direction Dz at the representative point 87 of the three-dimensional block 83 including the reference position 71, from among the plurality of three-dimensional blocks, may be set as the coordinate value in the vertical direction Dz at the reference position 71.

In the above description, when estimating the effective three-dimensional coordinate data at the lower first position 72La and the lower second position 72Lb, the second processing unit 62*b* uses the effective three-dimensional coordinate data at the plurality of lower target positions 71L. In addition, when estimating the effective three-dimensional coordinate data at the upper first position 72Ua and the upper second position 72Ub, the second processing unit 62*b* uses the effective three-dimensional coordinate data at the plurality of upper target positions 71U. However, also in the fourth determining method, as described in the respective determining methods described above, when the effective three-dimensional coordinate data at the lower first position 72La and the lower second position 72Lb are estimated in the second processing step S2*b*, the effective three-dimensional coordinate data at the plurality of lower width direction representative positions 75L may be used instead of the effective three-dimensional coordinate data at the plurality of lower target positions 71L. In addition, when the effective three-dimensional coordinate data at the upper first position 72Ua and the upper second position 72Ub are estimated, the effective three-dimensional coordinate data at the plurality of upper width direction representative positions 75U may be used.

In that case, the effective three-dimensional coordinate data at the lower width direction representative positions 75L and the upper width direction representative positions 75U are obtained by the first processing unit 62*a* using the function F4 used for obtaining the effective three-dimensional coordinate data at the reference positions 71.

As described above, in the present embodiment, the displacement amounts of the upper target position 71U and the lower target position 71L in the vertical direction Dz when the casing 30 changes from the open state to the fastened state are calculated in accordance with the difference between the position on the upper flange surface 33U in the vertical direction Dz of the upper target position 71U from which a displacement amount in the vertical direction Dz is to be obtained and the position on the lower flange surface 33L in the vertical direction Dz of the lower target position 71L from which a displacement amount in the vertical direction Dz is to be obtained. Accordingly, the present embodiment can calculate the displacement amounts of the upper target position 71U and the lower target position 71L in the vertical direction Dz without simulating the deformation of the lower-half casing 30L and the upper-half casing 30U using the finite element models of the lower-half casing 30L and the upper-half casing 30U. Therefore, the present embodiment can reduce the calculation load for calculating the displacement amounts. As a result, the present embodiment can reduce a preparation period and costs for the estimation of the flange surfaces.

The present embodiment needs three-dimensional coordinate data at the following four points in the open state in obtaining the displacement amounts of the upper target position 71U and the lower target position 71L in the vertical direction Dz.

a) The lower first position 72La that is coincident with, in the horizontal direction on a surface continuous with the lower flange surface 33L, the first representative position 74*a* to which the largest load is applied in the first supported portion 35*a* b) The lower second position 72Lb that is coincident with, in the horizontal direction on a surface continuous with the lower flange surface 33L, the second representative position 74*b* to which the largest load is applied in the second supported portion 35*b* c) The upper first position 72Ua that is coincident with the first representative position 74*a* in the horizontal direction on a surface continuous with the upper flange surface 33U d) The upper second position 72Ub that is coincident with the second representative position 74*b* in the horizontal direction on a surface continuous with the upper flange surface 33U In the present embodiment, the effective three-dimensional coordinate data at the above-described four points are estimated by executing the first processing step S2*a* and the second processing step S2*b*. Accordingly, the present embodiment can calculate the displacement amounts of the upper target position 71U and the lower target position 71L in the vertical direction Dz even when the upper surface 35*ap* of the first supported portion 35*a* and the upper surface 35*bp* of the second supported portion 35*b* are shifted in the vertical direction Dz with respect to the lower flange surface 33L and the measured three-dimensional coordinate data of the lower first position 72La, the lower second position 72Lb, the upper first position 72Ua, and the upper second position 72Ub cannot be acquired.

As above, the embodiments of the present disclosure have been described in detail. However, the present disclosure is not limited by the embodiments described above. Various additions, changes, substitutions, partial deletions, and the like can be made without departing from the scope and the spirit of the present invention derived from the contents and equivalents thereof defined in the claims. A step of estimating data is included.

Supplementary Notes

The method for estimating a flange displacement amount in a rotary machine according to the embodiments described above can be understood, for example, as follows.

(1) A method for estimating a flange displacement amount in a rotary machine according to a first aspect is applied to a rotary machine below.

The rotary machine includes a rotor 15 rotatable about an axis Ar extending in a horizontal direction, a casing 30 covering an outer periphery of the rotor 15, a stationary component disposed in the casing 30 and attached to the casing 30, and a base frame 11 supporting the casing 30 from below. The casing 30 includes an upper-half casing 30U on an upper side, a lower-half casing 30L on a lower side, and a plurality of bolts 39 fastening the upper-half casing 30U to the lower-half casing 30L. The upper-half casing 30U includes an upper flange 32U formed with an upper flange surface 33U facing downward. The lower-half casing 30L includes a lower flange 32L formed with a lower flange surface 33L facing upward and opposing the upper flange surface 33U in a vertical direction Dz, and a first supported portion 35*a* and a second supported portion 35*b* that are continuous with the lower flange 32L, supported by the base frame 11 from below, and separated from each other in an axial direction Dy in which the axis Ar extends. The upper flange 32U and the lower flange 32L include bolt holes 34 extending therethrough in the vertical direction Dz, and the respective plurality of bolts 39 can be inserted into the bolt holes 34. An upper surface 35*ap* of the first supported portion 35*a* and an upper surface 35*bp* of the second supported portion 35*b* are shifted in the vertical direction Dz with respect to the lower flange surface 33L.

The method for estimating a flange displacement amount in a rotary machine above performs:

a measured coordinate receiving step S1 of receiving measured three-dimensional coordinate data at a plurality of positions on the upper flange surface 33U and measured three-dimensional coordinate data at a plurality of positions on the lower flange surface 33L, the measured three-dimensional coordinate data being measured after the rotary machine is disassembled and in an open state where the upper-half casing 30U is not fastened to the lower-half casing 30L by the plurality of bolts 39;

an effective coordinate determining step S2 of determining effective three-dimensional coordinate data at a lower first position 72La, a lower second position 72Lb, and a lower target position 71L by using the measured three-dimensional coordinate data at the plurality of positions on the lower flange surface 33L, the lower first position 72La being coincident with a first representative position 74*a* to which the largest load is applied in the first supported portion 35*a* in a horizontal direction on a virtual plane continuous with the lower flange surface 33L, the lower second position 72Lb being coincident with a second representative position 74*b* to which the largest load is applied in the second supported portion 35*b* in the horizontal direction on the virtual plane continuous with the lower flange surface 33L, and the lower target position 71L being a position on the lower flange surface 33L from which a displacement amount in a vertical direction Dz when a state changes from the open state to a fastened state where the upper-half casing 30U is fastened to the lower-half casing 30L by the plurality of bolts 39 is to be obtained, and determining effective three-dimensional coordinate data at an upper first position 72Ua, an upper second position 72Ub, and an upper target position 71U by using the measured three-dimensional coordinate data at the plurality of positions on the upper flange surface 33U, the upper first position 72Ua being coincident with the first representative position 74*a* in the horizontal direction on a virtual plane continuous with the upper flange surface 33U, the upper second position 72Ub being coincident with the second representative position 74*b* in the horizontal direction on the virtual plane continuous with the upper flange surface 33U, and the upper target position 71U being coincident with the lower target position 71L in the horizontal direction on the upper flange surface 33U;

a coordinate change step S3 of changing the effective three-dimensional coordinate data determined in the effective coordinate determining step S2 such that the effective three-dimensional coordinate data at the lower first position 72La and the effective three-dimensional coordinate data at the upper first position 72Ua determined in the effective coordinate determining step S2 are coincident with each other, and the effective three-dimensional coordinate data at the lower second position 72Lb and the effective three-dimensional coordinate data at the upper second position 72Ub determined in the effective coordinate determining step S2 are coincident with each other; and a displacement amount calculation step S4 of calculating a displacement amount of the upper target position 71U in the vertical direction Dz and a displacement amount of the lower target position 71L in the vertical direction Dz when a state changes from the open state to the fastened state in accordance with a difference between a position in the vertical direction Dz indicated by the effective three-dimensional coordinate data at the upper target position 71U after the coordinate change step S3 and a position in the vertical direction Dz indicated by the effective three-dimensional coordinate data at the lower target position 71L after the coordinate change step S3. The effective coordinate determining step S2 includes:

a first processing step S2*a* of determining effective three-dimensional coordinate data at a lower edge first position 73La indicating a position of a boundary with the first supported portion 35*a* on the lower flange surface 33L, a lower edge second position 73Lb indicating a position of a boundary with the second supported portion 35*b* on the lower flange surface 33L, and the lower target position 71L by using the measured three-dimensional coordinate data at the plurality of positions on the lower flange surface 33L and determining effective three-dimensional coordinate data at an upper edge first position 73Ua, an upper edge second position 73Ub, and the upper target position 71U by using the measured three-dimensional coordinate data at the plurality of positions on the upper flange surface 33U, the upper edge first position 73Ua being coincident with the lower edge first position 73La in the horizontal direction on the upper flange surface 33U, the upper edge second position 73Ub being coincident with the lower edge second position 73Lb in the horizontal direction on the upper flange surface 33U; and a second processing step S2*b* of estimating effective three-dimensional coordinate data at the lower first position 72La and the lower second position 72Lb from a change tendency of effective three-dimensional coordinate data at the plurality of positions on the lower flange surface 33L including the lower edge first position 73La and the lower edge second position 73Lb and estimating effective three-dimensional coordinate data at the upper first position 72Ua and the upper second position 72Ub from a change tendency of effective three-dimensional coordinate data at the plurality of positions on the upper flange surface 33U including the upper edge first position 73Ua and the upper edge second position 73Ub.

The present aspect calculates the displacement amounts of the upper target position 71U and the lower target position 71L in the vertical direction Dz when the casing 30 changes from the open state to the fastened state in accordance with the difference between the position on the upper flange surface 33 in the vertical direction Dz of the upper target position 71U from which a displacement amount in the vertical direction Dz when the casing 30 changes from the open state to the fastened state is to be obtained and the position on the lower flange surface 33L in the vertical direction Dz of the lower target position 71L from which a displacement amount in the vertical direction Dz when the casing 30 changes from the open state to the fastened state is to be obtained. Accordingly, the present aspect can calculate the displacement amounts of the upper target position 71U and the lower target position 71L in the vertical direction Dz without simulating the deformation of the lower-half casing 30L and the upper-half casing 30U using the finite element models of the lower-half casing 30L and the upper-half casing 30U. Therefore, the present aspect can reduce the calculation load for calculating the displacement amounts.

The present aspect needs three-dimensional coordinate data at the following four points in the open state in obtaining the displacement amounts of the upper target position 71U and the lower target position 71L in the vertical direction Dz.

a) The lower first position 72La that is coincident with, in the horizontal direction on a surface continuous with the lower flange surface 33L, the first representative position 74*a* to which the largest load is applied in the first supported portion 35*a* b) The lower second position 72Lb that is coincident with, in the horizontal direction on a surface continuous with the lower flange surface 33L, the second representative position 74*b* to which the largest load is applied in the second supported portion 35*b* c) The upper first position 72Ua that is coincident with the first representative position 74*a* in the horizontal direction on a surface continuous with the upper flange surface 33U d) The upper second position 72Ub that is coincident with the second representative position 74*b* in the horizontal direction on a surface continuous with the upper flange surface 33U The present aspect estimates the effective three-dimensional coordinate data at the above-described four points by executing the first processing step S2*a* and the second processing step S2*b*. Accordingly, the present aspect can calculate the displacement amounts of the upper target position 71U and the lower target position 71L in the vertical direction Dz even when the upper surface 35*ap* of the first supported portion 35*a* and the upper surface 35*bp* of the second supported portion 35*b* are shifted in the vertical direction Dz with respect to the lower flange surface 33L and the measured three-dimensional coordinate data of the lower first position 72La, the lower second position 72Lb, the upper first position 72Ua, and the upper second position 72Ub cannot be acquired.

(2) A method for estimating a flange displacement amount in a rotary machine according to a second aspect is the method for estimating a flange displacement amount in a rotary machine according to the first aspect, wherein in the first processing step S2*a*, effective three-dimensional coordinate data at a lower width direction representative position 75L which is a predetermined position in the axial direction Dy and is a center position in a flange width direction Dw on the lower flange surface 33L is determined by using the measured three-dimensional coordinate data at the plurality of positions on the lower flange surface 33L, and effective three-dimensional coordinate data at an upper width direction representative position 75U which is coincident with the lower width direction representative position 75L in the horizontal direction on the upper flange surface 33U is determined by using the measured three-dimensional coordinate data at the plurality of positions on the upper flange surface 33U. In the second processing step S2*b*, the effective three-dimensional coordinate data at the lower first position 72La and the lower second position 72Lb are estimated from a change tendency of the effective three-dimensional coordinate data at the lower edge first position 73La, the lower edge second position 73Lb, and the lower width direction representative position 75L, and the effective three-dimensional coordinate data at the upper first position 72Ua and the upper second position 72Ub are estimated from a change tendency of the effective three-dimensional coordinate data at the upper edge first position 73Ua, the upper edge second position 73Ub, and the upper width direction representative position 75U.

The change tendency of the effective three-dimensional coordinate data at the lower edge first position 73La, the lower edge second position 73Lb, and the lower width direction representative position 75L reflects the three-dimensional coordinate data at the lower first position 72La and the lower second position 72Lb more accurately than, for example, a change tendency of the three-dimensional coordinate data at the lower edge first position 73La, the lower edge second position 73Lb, and inner side edges of the lower flange surface 33L, or a change tendency of the three-dimensional coordinate data at the lower edge first position 73La, the lower edge second position 73Lb, and outer side edges of the lower flange surface 33L. Thus, the present aspect estimates the lower first position 72La and the lower second position 72Lb from the change tendency of the effective three-dimensional coordinate data at the lower edge first position 73La, the lower edge second position 73Lb, and the lower width direction representative position 75L.

On the other hand, the change tendency of the effective three-dimensional coordinate data at the upper edge first position 73Ua, the upper edge second position 73Ub, and the upper width direction representative position 75U reflects the three-dimensional coordinate data at the upper first position 72Ua and the upper second position 72Ub more accurately than, for example, a change tendency of the three-dimensional coordinate data at the upper edge first position 73Ua, the upper edge second position 73Ub, and inner side edges of the upper flange surface 33U, or a change tendency of the three-dimensional coordinate data at the upper edge first position 73Ua, the upper edge second position 73Ub, and outer side edges of the upper flange surface 33U. Thus, the present aspect estimates the upper first position 72Ua and the upper second position 72Ub from the change tendency of the effective three-dimensional coordinate data at the upper edge first position 73Ua, the upper edge second position 73Ub, and the upper width direction representative positions 75U.

(3) A method for estimating a flange displacement amount in a rotary machine according to a third aspect is the method for estimating a flange displacement amount in a rotary machine according to the first aspect, wherein, in the second processing step S2*b*, the effective three-dimensional coordinate data at the lower first position 72La and the lower second position 72Lb are estimated from a change tendency of the effective three-dimensional coordinate data at the lower edge first position 73La, the lower edge second position 73Lb, and the lower target position 71L, and the effective three-dimensional coordinate data at the upper first position 72Ua and the upper second position 72Ub are estimated from a change tendency of the effective three-dimensional coordinate data at the upper edge first position 73Ua, the upper edge second position 73Ub, and the upper target position 71U.

The present aspect estimates the effective three-dimensional coordinate data at the lower first position 72La and the lower second position 72Lb by using the effective three-dimensional coordinate data at the lower target position 71L necessary for the displacement amount calculation step S4. Further, the present aspect estimates the effective three-dimensional coordinate data at the upper first position 72Ua and the upper second position 72Ub by using the effective three-dimensional coordinate data at the upper target position 71U necessary for the displacement amount calculation step S4. Accordingly, the present aspect can minimize time and effort in estimating the effective three-dimensional coordinate data at the lower first position 72La, the lower second position 72Lb, the upper first position 72Ua, and the upper second position 72Ub.

(4) A method for estimating a flange displacement amount in a rotary machine according to a fourth aspect is the method for estimating a flange displacement amount in a rotary machine according to any one of the first to the third aspects, wherein in the displacement amount calculation step S4, one-half of the difference is used as the displacement amount of the upper target position 71U and the displacement amount of the lower target position 71L.

(5) A method for estimating a flange displacement amount in a rotary machine according to a fifth aspect is the method for estimating a flange displacement amount in a rotary machine according to any one of the first to the fourth aspect, wherein the lower target position 71L is a position at which the stationary component is disposed in the axial direction Dy and is a position at an inner side edge on the lower flange surface 33L.

From the viewpoint of performance and the like of the rotary machine, gaps in the radial direction Dr between the stationary components and the rotor 15 needs to be controlled. The present inventors have found that changes in the gaps in the radial direction Dr between the stationary components and the rotor 15 due to the deformation of the lower-half casing 30L and the upper-half casing 30U by changing the casing 30 from the open state to the fastened state are dominant over the deformation in the positions on the lower flange surface 33L at which the stationary component storage portions 36 are formed in the axial direction Dy and which are located at the inner side edges of the lower flange surface 33L and the deformation in the positions on the upper flange surface 33U at which the stationary component storage portions 36 are formed in the axial direction Dy and which are located at the inner side edges on the upper flange surface 33U. Accordingly, the present aspect can control the gaps in the radial direction Dr between the stationary components and the rotor 15 by changing the casing 30 from the open state to the fastened state with high accuracy.

(6) A method for estimating a flange displacement amount in a rotary machine according to a sixth aspect is the method for estimating a flange displacement amount according to any one of the first to the fifth aspects, wherein in the measured coordinate receiving step S1, measured three-dimensional coordinate data at the lower target position 71L and the upper target position 71U are received. In the effective coordinate determining step S2, the measured three-dimensional coordinate data of the lower target position 71L is determined to be effective three-dimensional coordinate data of the lower target position 71L as is, and the measured three-dimensional coordinate data of the upper target position 71U acquired in the measured coordinate receiving step S1 is determined to be effective three-dimensional coordinate data of the upper target position 71U as is.

In the present aspect, the measured three-dimensional coordinate data of the lower first position 72La and the lower second position 72Lb acquired in the measured coordinate receiving step S1 are determined to be the effective three-dimensional coordinate data at the lower first position 72La and the lower second position 72Lb as is, allowing the calculation load to be reduced.

(7) A method for estimating a flange displacement amount in a rotary machine according to a seventh aspect is the method for estimating a flange displacement amount in a rotary machine according to any one of the first to the fifth aspects, wherein, in the measured coordinate receiving step S1, measured three-dimensional coordinate data at a plurality of positions on a lower virtual line 76L passing through the lower target position 71L and extending in a flange width direction Dw are received, and measured three-dimensional coordinate data at a plurality of positions on an upper virtual line 76U passing through the upper target position 71U and extending in the flange width direction Dw are received. In the effective coordinate determining step S2, the effective three-dimensional coordinate data of the lower target position 71L is obtained from the measured three-dimensional coordinate data at the plurality of positions on the lower virtual line 76L, and the effective three-dimensional coordinate data of the upper target position 71U is obtained from the measured three-dimensional coordinate data at the plurality of positions on the upper virtual line 76U.

In the present aspect, the effective three-dimensional coordinate data of the lower target position 71L is obtained from the measured three-dimensional coordinate data at the plurality of positions on the lower virtual line 76L, and the effective three-dimensional coordinate data of the upper target position 71U is obtained from the measured three-dimensional coordinate data at the plurality of positions on the upper virtual line 76U. Thus, in the present aspect, the effective three-dimensional coordinate data at the lower target position 71L and the upper target position 71U are less likely to be affected by a local shape change, and the possibility of including a large measurement error can be reduced.

(8) A method for estimating a flange displacement amount in a rotary machine according to an eighth aspect is the method for estimating a flange displacement amount in a rotary machine according to any one of the first to the fifth aspects, wherein, in the measured coordinate receiving step S1, measured three-dimensional coordinate data at a plurality of positions in a lower measurement region including the lower target position 71L on the lower flange surface 33L are received, and measured three-dimensional coordinate data at a plurality of positions in an upper measurement region including the upper target position 71U on the upper flange surface 33U are received. In the effective coordinate determining step S2, the effective three-dimensional coordinate data of the lower target position 71L is obtained by using the measured three-dimensional coordinate data at the plurality of positions in the lower measurement region received in the measured coordinate receiving step S1, and the effective three-dimensional coordinate data of the upper target position 71U is obtained by using the measured three-dimensional coordinate data at the plurality of positions in the upper measurement region received in the measured coordinate receiving step S1.

In the present aspect, the effective three-dimensional coordinate data of the lower target position 71L is obtained from the measured three-dimensional coordinate data at the plurality of positions in the lower measurement region, and the effective three-dimensional coordinate data of the upper target position 71U is obtained from the measured three-dimensional coordinate data at the plurality of positions in the upper measurement region. Thus, in the present aspect, the effective three-dimensional coordinate data at the lower target position 71L and the upper target position 71U are less likely to be affected by a local shape change, and the possibility of including a large measurement error can be reduced.

(9) A method for estimating a flange displacement amount in a rotary machine according to a ninth aspect is the method for estimating a flange displacement amount in a rotary machine according to any one of the first to the fifth aspects, wherein in the measured coordinate receiving step S1, measured three-dimensional coordinate data at a plurality of positions over an entirety of the lower flange surface 33L are received and measured three-dimensional coordinate data at a plurality of positions over an entirety of the upper flange surface 33U are received. In the effective coordinate determining step S2, shape data of the lower flange surface 33L indicating three-dimensional shape of the entirety of the lower flange surface 33L is obtained by using the measured three-dimensional coordinate data at the plurality of positions over the entirety of the lower flange surface 33L received in the measured coordinate receiving step S1, and shape data of the upper flange surface 33U indicating three-dimensional shape of the entirety of the upper flange surface 33U is obtained by using the measured three-dimensional coordinate data at the plurality of positions over the entirety of the upper flange surface 33U received in the measured coordinate receiving step S1. Further, the effective three-dimensional coordinate data of the lower target position 71L is obtained by using the shape data of the lower flange surface 33L, and the effective three-dimensional coordinate data of the upper target position 71U is obtained by using the shape data of the upper flange surface 33U.

In the present aspect, the effective three-dimensional coordinate data of the lower target position 71L is obtained from the measured three-dimensional coordinate data at the plurality of positions over the entire lower flange surface 33L, and the effective three-dimensional coordinate data of the upper target position 71U is obtained from the measured three-dimensional coordinate data at the plurality of positions over the entire upper flange surface 33U. Thus, in the present aspect, the effective three-dimensional coordinate data at the lower target position 71L and the upper target position 71U are less likely to be affected by a local shape change, and the possibility of including a large measurement error can be reduced. Further, in the present aspect, the effective three-dimensional coordinate data at the lower target position 71L and the upper target position 71U can be determined even when there is a wide range of data deficiency due to an obstacle or the like.

The program for estimating a flange displacement amount in a rotary machine according to the embodiments described above can be understood, for example, as follows.

(10) A program for estimating a flange displacement amount in a rotary machine according to a tenth aspect is applied to a rotary machine below.

The rotary machine includes a rotor 15 rotatable about an axis Ar extending in a horizontal direction, a casing 30 covering an outer periphery of the rotor 15, a stationary component disposed in the casing 30 and attached to the casing 30, and a base frame 11 supporting the casing 30 from below. The casing 30 includes an upper-half casing 30U on an upper side, a lower-half casing 30L on a lower side, and a plurality of bolts 39 fastening the upper-half casing 30U to the lower-half casing 30L. The upper-half casing 30U includes an upper flange 32U formed with an upper flange surface 33U facing downward. The lower-half casing 30L includes a lower flange 32L formed with a lower flange surface 33L facing upward and opposing the upper flange surface 33U in a vertical direction Dz, and a first supported portion 35*a* and a second supported portion 35*b* that are continuous with the lower flange 32L, supported by the base frame 11 from below; and separated from each other in an axial direction Dy in which the axis Ar extends. The upper flange 32U and the lower flange 32L include bolt holes 34 extending therethrough in the vertical direction Dz, and the respective plurality of bolts 39 can be inserted into the bolt holes 34. An upper surface 35*ap* of the first supported portion 35*a* and an upper surface 35*bp* of the second supported portion 35*b* are shifted in the vertical direction Dz with respect to the lower flange surface 33L.

The program for estimating a flange displacement amount in a rotary machine above causes a computer to execute:

a measured coordinate receiving step S1 of receiving measured three-dimensional coordinate data at a plurality of positions on the upper flange surface 33U and measured three-dimensional coordinate data at a plurality of positions on the lower flange surface 33L, the measured three-dimensional coordinate data being measured after the rotary machine is disassembled and in an open state where the upper-half casing 30U is not fastened to the lower-half casing 30L by the plurality of bolts 39;

an effective coordinate determining step S2 of determining effective three-dimensional coordinate data at a lower first position 72La, a lower second position 72Lb, and a lower target position 71L by using the measured three-dimensional coordinate data at the plurality of positions on the lower flange surface 33L, the lower first position 72La being coincident with a first representative position 74*a* to which the largest load is applied in the first supported portion 35*a* in a horizontal direction on a virtual plane continuous with the lower flange surface 33L, the lower second position 72Lb being coincident with a second representative position 74*b* to which the largest load is applied in the second supported portion 35*b* in the horizontal direction on the virtual plane continuous with the lower flange surface 33L, and the lower target position 71L being a position on the lower flange surface 33L from which a displacement amount in a vertical direction Dz when a state changes from the open state to a fastened state where the upper-half casing 30U is fastened to the lower-half casing 30L by the plurality of bolts 39 is to be obtained, and determining effective three-dimensional coordinate data at an upper first position 72Ua, an upper second position 72Ub, and an upper target position 71U by using the measured three-dimensional coordinate data at the plurality of positions on the upper flange surface 33U, the upper first position 72Ua being coincident with the first representative position 74*a* in the horizontal direction on a virtual plane continuous with the upper flange surface 33U, the upper second position 72Ub being coincident with the second representative position 74*b* in the horizontal direction on the virtual plane continuous with the upper flange surface 33U, and the upper target position 71U being coincident with the lower target position 71L in the horizontal direction on the upper flange surface 33U;

a coordinate change step S3 of changing the effective three-dimensional coordinate data determined in the effective coordinate determining step S2 such that the effective three-dimensional coordinate data at the lower first position 72La and the effective three-dimensional coordinate data at the upper first position 72Ua determined in the effective coordinate determining step S2 are coincident with each other, and the effective three-dimensional coordinate data at the lower second position 72Lb and the effective three-dimensional coordinate data at the upper second position 72Ub determined in the effective coordinate determining step S2 are coincident with each other; and a displacement amount calculation step S4 of calculating a displacement amount of the upper target position 71U in the vertical direction Dz and a displacement amount of the lower target position 71L in the vertical direction Dz when a state changes from the open state to the fastened state in accordance with a difference between a position in the vertical direction Dz indicated by the effective three-dimensional coordinate data at the upper target position 71U after the coordinate change step S3 and a position in the vertical direction Dz indicated by the effective three-dimensional coordinate data at the lower target position 71L after the coordinate change step S3. The effective coordinate determining step S2 includes:

a first processing step S2*a* of determining effective three-dimensional coordinate data at a lower edge first position 73La indicating a position of a boundary with the first supported portion 35*a* on the lower flange surface 33L, a lower edge second position 73Lb indicating a position of a boundary with the second supported portion 35*b* on the lower flange surface 33L, and the lower target position 71L by using the measured three-dimensional coordinate data at the plurality of positions on the lower flange surface 33L and determining effective three-dimensional coordinate data at an upper edge first position 73Ua, an upper edge second position 73Ub, and the upper target position 71U by using the measured three-dimensional coordinate data at the plurality of positions on the upper flange surface 33U, the upper edge first position 73Ua being coincident with the lower edge first position 73La in the horizontal direction on a surface continuous with the upper flange surface 33U, the upper edge second position 73Ub being coincident with the lower edge second position 73Lb in the horizontal direction on a surface continuous with the upper flange surface 33U; and a second processing step S2*b* of estimating effective three-dimensional coordinate data at the lower first position 72La and the lower second position 72Lb from a change tendency of effective three-dimensional coordinate data at the plurality of positions on the lower flange surface 33L including the lower edge first position 73La and the lower edge second position 73Lb and estimating effective three-dimensional coordinate data at the upper first position 72Ua and the upper second position 72Ub from a change tendency of effective three-dimensional coordinate data at the plurality of positions on the upper flange surface 33U including the upper edge first position 73Ua and the upper edge second position 73Ub.

In the present aspect, causing the computer to execute the program can reduce the calculation load for calculating the displacement amounts similar to the first aspect. Further, similar to the first aspect, the present aspect can calculate, by causing the computer to execute the program, the displacement amounts of the upper target position 71U and the lower target position 71L in the vertical direction Dz even when the upper surface 35*ap* of the first supported portion 35*a* and the upper surface 35*bp* of the second supported portion 35*b* are shifted in the vertical direction Dz with respect to the lower flange surface 33L and the measured three-dimensional coordinate data of the lower first position 72La, the lower second position 72Lb, the upper first position 72Ua, and the upper second position 72Ub cannot be acquired.

(11) A program for estimating a flange displacement amount in a rotary machine according to an eleventh aspect is the program for estimating a flange displacement amount in a rotary machine according to the tenth aspect, wherein in the first processing step S2*a*, effective three-dimensional coordinate data at a lower width direction representative position 75L which is a predetermined position in the axial direction Dy and is a center position in a flange width direction Dw on the lower flange surface 33L is determined by using the measured three-dimensional coordinate data at the plurality of positions on the lower flange surface 33L, and effective three-dimensional coordinate data at an upper width direction representative position 75U which is coincident with the lower width direction representative position 75L in the horizontal direction on the upper flange surface 33U is determined by using the measured three-dimensional coordinate data at the plurality of positions on the upper flange surface 33U. In the second processing step S2*b*, the effective three-dimensional coordinate data at the lower first position 72La and the lower second position 72Lb are estimated from a change tendency of the effective three-dimensional coordinate data at the lower edge first position 73La, the lower edge second position 73Lb, and the lower width direction representative position 75L, and the effective three-dimensional coordinate data at the upper first position 72Ua and the upper second position 72Ub are estimated from a change tendency of the effective three-dimensional coordinate data at the upper edge first position 73Ua, the upper edge second position 73Ub, and the upper width direction representative position 75U.

Similar to the second aspect, the present aspect can increase, by causing the computer to execute the program, the accuracy of estimating the effective three-dimensional coordinate data at the upper first position 72Ua and the upper second position 72Ub.

(12) A program for estimating a flange displacement amount in a rotary machine according to a twelfth aspect is the program for estimating a flange displacement amount in a rotary machine according to the tenth aspect, wherein in the second processing step S2*b*, the effective three-dimensional coordinate data at the lower first position 72La and the lower second position 72Lb are estimated from a change tendency of the effective three-dimensional coordinate data at the lower edge first position 73La, the lower edge second position 73Lb, and the lower target position 71L, and the effective three-dimensional coordinate data at the upper first position 72Ua and the upper second position 72Ub are estimated from a change tendency of the effective three-dimensional coordinate data at the upper edge first position 73Ua, the upper edge second position 73Ub, and the upper target position 71U.

Similar to the third aspect, the present aspect can minimize, by causing the computer to execute the program, time and effort in estimating the effective three-dimensional coordinate data at the lower first position 72La, the lower second position 72Lb, the upper first position 72Ua, and the upper second position 72Ub.

(13) A program for estimating a flange displacement amount in a rotary machine according to a thirteenth aspect is the program for estimating a flange displacement amount in a rotary machine according to any one of the tenth to the twelfth aspect, wherein in the displacement amount calculation step S4, one-half of the difference is used as the displacement amount of the upper target position 71U and the displacement amount of the lower target position 71L.

The device for estimating a flange displacement amount in a rotary machine according to the embodiments described above can be understood, for example, as follows.

(14) A device for estimating a flange displacement amount in a rotary machine according to a fourteenth aspect is applied to a rotary machine below.

The rotary machine includes a rotor 15 rotatable about an axis Ar extending in a horizontal direction, a casing 30 covering an outer periphery of the rotor 15, a stationary component disposed in the casing 30 and attached to the casing 30, and a base frame 11 supporting the casing 30 from below. The casing 30 includes an upper-half casing 30U on an upper side, a lower-half casing 30L on a lower side, and a plurality of bolts 39 fastening the upper-half casing 30U to the lower-half casing 30L. The upper-half casing 30U includes an upper flange 32U formed with an upper flange surface 33U facing downward. The lower-half casing 30L includes a lower flange 32L formed with a lower flange surface 33L facing upward and opposing the upper flange surface 33U in a vertical direction Dz and a first supported portion 35*a* and a second supported portion 35*b* that are continuous with the lower flange 32L, supported by the base frame 11 from below, and separated from each other in an axial direction Dy in which the axis Ar extends. The upper flange 32U and the lower flange 32L include bolt holes 34 extending therethrough in the vertical direction Dz, and the respective plurality of bolts 39 can be inserted into the bolt holes 34. An upper surface 35*ap* of the first supported portion 35*a* and an upper surface 35*bp* of the second supported portion 35*b* are shifted in the vertical direction Dz with respect to the lower flange surface 33L.

A device for estimating a flange displacement amount 50 in a rotary machine above includes:

a measured coordinate receiving unit 61 configured to receive measured three-dimensional coordinate data at a plurality of positions on the upper flange surface 33U and measured three-dimensional coordinate data at a plurality of positions on the lower flange surface 33L, the measured three-dimensional coordinate data being measured after the rotary machine is disassembled and in an open state where the upper-half casing 30U is not fastened to the lower-half casing 30L by the plurality of bolts 39;

an effective coordinate determining unit 62 configured to determine effective three-dimensional coordinate data at a lower first position 72La, a lower second position 72Lb, and a lower target position 71L by using the measured three-dimensional coordinate data at the plurality of positions on the lower flange surface 33L, the lower first position being coincident with a first representative position 74*a* to which the largest load is applied in the first supported portion 35*a* in a horizontal direction on a virtual plane continuous with the lower flange surface 33L, the lower second position 72Lb being coincident with a second representative position 74*b* to which the largest load is applied in the second supported portion 35*b* in the horizontal direction on the virtual plane continuous with the lower flange surface 33L, and the lower target position 71L being a position on the lower flange surface 33L from which a displacement amount in a vertical direction Dz when a state changes from the open state to a fastened state where the upper-half casing 30U is fastened to the lower-half casing 30L by the plurality of bolts 39 is to be obtained, and determine effective three-dimensional coordinate data at an upper first position 72Ua, an upper second position 72Ub, and an upper target position 71U by using the measured three-dimensional coordinate data at the plurality of positions on the upper flange surface 33U, the upper first position 72Ua being coincident with the first representative position 74*a* in the horizontal direction on a virtual plane continuous with the upper flange surface 33U, the upper second position 72Ub being coincident with the second representative position 74*b* in the horizontal direction on the virtual plane continuous with the upper flange surface 33U, and the upper target position 71U being coincident with the lower target position 71L in the horizontal direction on the upper flange surface 33U;

a coordinate change unit 63 configured to change the effective three-dimensional coordinate data determined by the effective coordinate determining unit 62 such that the effective three-dimensional coordinate data at the lower first position 72La and the effective three-dimensional coordinate data at the upper first position 72Ua determined by the effective coordinate determining unit 62 are coincident with each other, and the effective three-dimensional coordinate data at the lower second position 72Lb and the effective three-dimensional coordinate data at the upper second position 72Ub determined by the effective coordinate determining unit 62 are coincident with each other;

a displacement amount calculation unit 64 configured to calculate a displacement amount of the upper target position 71U in the vertical direction Dz and a displacement amount of the lower target position 71L in the vertical direction Dz when a state changes from the open state to the fastened state in accordance with a difference between a position in the vertical direction Dz indicated by the effective three-dimensional coordinate data at the upper target position 71U after a coordinate change and a position in the vertical direction Dz indicated by the effective three-dimensional coordinate data at the lower target position 71L after the coordinate change. The effective coordinate determining unit 62 includes:

a first processing unit 62*a* configured to determine effective three-dimensional coordinate data at a lower edge first position 73La indicating a position of a boundary with the first supported portion 35*a* on the lower flange surface 33L, a lower edge second position 73Lb indicating a position of a boundary with the second supported portion 35*b* on the lower flange surface 33L, and the lower target position 71L by using the measured three-dimensional coordinate data at the plurality of positions on the lower flange surface 33L and determine effective three-dimensional coordinate data at an upper edge first position 73Ua, an upper edge second position 73Ub, and the upper target position 71U by using the measured three-dimensional coordinate data at the plurality of positions on the upper flange surface 33U, the upper edge first position 73Ua being coincident with the lower edge first position 73La in the horizontal direction on a surface continuous with the upper flange surface 33U, the upper edge second position 73Ub being coincident with the lower edge second position 73Lb in the horizontal direction on a surface continuous with the upper flange surface 33U; and a second processing unit 62*b* configured to estimate effective three-dimensional coordinate data at the lower first position 72La and the lower second position 72Lb from a change tendency of effective three-dimensional coordinate data at the plurality of positions on the lower flange surface 33L including the lower edge first position 73La and the lower edge second position 73Lb and estimate effective three-dimensional coordinate data at the upper first position 72Ua and the upper second position 72Ub from a change tendency of effective three-dimensional coordinate data at the plurality of positions on the upper flange surface 33U including the upper edge first position 73Ua and the upper edge second position 73Ub.

The present aspect can reduce the calculation load for calculating the displacement amounts similar to the first aspect. Further, similar to the first aspect, the present aspect can calculate, by causing the computer to execute the program, the displacement amounts of the upper target position 71U and the lower target position 71L in the vertical direction Dz even when the upper surface 35*ap* of the first supported portion 35*a* and the upper surface 35*bp* of the second supported portion 35*b* are shifted in the vertical direction Dz with respect to the lower flange surface 33L and the measured three-dimensional coordinate data of the lower first position 72La, the lower second position 72Lb, the upper first position 72Ua, and the upper second position 72Ub cannot be acquired.

(15) A device for estimating a flange displacement amount in a rotary machine according to a fifteenth aspect is the device for estimating a flange displacement amount 50 in a rotary machine according to the fourteenth aspect, wherein the first processing unit 62*a* determines effective three-dimensional coordinate data at a lower width direction representative position 75L which is a predetermined position in the axial direction Dy and is a center position in a flange width direction Dw on the lower flange surface 33L by using the measured three-dimensional coordinate data at the plurality of positions on the lower flange surface 33L and determines effective three-dimensional coordinate data at an upper width direction representative position 75U which is coincident with the lower width direction representative position 75L in the horizontal direction on the upper flange surface 33U by using the measured three-dimensional coordinate data at the plurality of positions on the upper flange surface 33U. The second processing unit 62*b* estimates the effective three-dimensional coordinate data at the lower first position 72La and the lower second position 72Lb from a change tendency of the effective three-dimensional coordinate data at the lower edge first position 73La, the lower edge second position 73Lb, and the lower width direction representative position 75L and estimates the effective three-dimensional coordinate data at the upper first position 72Ua and the upper second position 72Ub from a change tendency of the effective three-dimensional coordinate data at the upper edge first position 73Ua, the upper edge second position 73Ub, and the upper width direction representative position 75U.

Similar to the second aspect, the present aspect can increase the accuracy of estimating the effective three-dimensional coordinate data at the upper first position 72Ua and the upper second position 72Ub.

(16) A device for estimating a flange displacement amount in a rotary machine according to a sixteenth aspect is the device for estimating a flange displacement amount 50 in a rotary machine according to the fourteenth aspect, wherein the second processing unit 62*b* estimates the effective three-dimensional coordinate data at the lower first position 72La and the lower second position 72Lb from a change tendency of the effective three-dimensional coordinate data at the lower edge first position 73La, the lower edge second position 73Lb, and the lower target position 71L and estimates the effective three-dimensional coordinate data at the upper first position 72Ua and the upper second position 72Ub from a change tendency of the effective three-dimensional coordinate data at the upper edge first position 73Ua, the upper edge second position 73Ub, and the upper target position 71U.

Similar to the third aspect, the present aspect can minimize time and effort in estimating the effective three-dimensional coordinate data at the lower first position 72La, the lower second position 72Lb, the upper first position 72Ua, and the upper second position 72Ub.

(17) A device for estimating a flange displacement amount in a rotary machine according to a seventeenth aspect is the device for estimating a flange displacement amount 50 in a rotary machine according to any one of the fourteenth to the sixteenth aspect, wherein the displacement amount calculation unit 64 uses one-half of the difference as the displacement amount of the upper target position 71U and the displacement amount of the lower target position 71L.

INDUSTRIAL APPLICABILITY

One aspect of the present disclosure can estimate the displacement amounts of the flange surfaces of the upper-half casing and the lower-half casing while reducing the calculation load. As a result, one aspect of the present disclosure can reduce a preparation period and costs for the estimation of the flange surfaces. Further, one aspect of the present disclosure can calculate the displacement amounts of the upper target position and the lower target position in the vertical direction even when the upper surface of the first supported portion and the upper surface of the second supported portion are shifted in the vertical direction with respect to the lower flange surface and the measured three-dimensional coordinate data of the lower first position, the lower second position, the upper first position, and the upper second position cannot be acquired.

REFERENCE SIGNS LIST

10: Steam turbine (rotary machine)
11: Base frame
12*a*: First shaft bearing device
12*b*: Second shaft bearing device
13*a*: First shaft sealing device (stationary component)
13*b*: Second shaft sealing device (stationary component)
15: Rotor
16: Rotor shaft
17: Rotor blade row
20: Diaphragm (stationary component)
20L: Lower-half diaphragm
20U: Upper-half diaphragm
22: Stator vane
23: Diaphragm inner ring
24: Diaphragm outer ring
25: Sealing device
30: Casing
30L: Lower-half casing
30U: Upper-half casing
31L: Lower-half casing main body
31U: Upper-half casing main body

32L: Lower flange
32U: Upper flange
33L: Lower flange surface
33U: Upper flange surface
34: Bolt hole
35*a*: First supported portion
35*ap*: Upper surface
35*b*: Second supported portion
35*bp*: Upper surface
36: Stationary component storage portion
39: Bolt
50: Device for estimating flange displacement amount
51: Manual input device
52: Display device
53: Input/output interface
54: Device interface
55: Communication interface
56: Storage and reproduction device
57: Memory
58: Auxiliary storage device
58*d*: Reference three-dimensional shape data
58*p*: Program for estimating flange displacement amount
60: CPU
61: Measured coordinate receiving unit
62: Effective coordinate determining unit
62*a*: First processing unit
62*b*: Second processing unit
63: Coordinate change unit
64: Displacement amount calculation unit
69: Three-dimensional shape measuring device
71: Reference position
71L: Lower target position
71U: Upper target position
72La: Lower first position
72Ua: Upper first position
72Lb: Lower second position
72Ub: Upper second position
73La: Lower edge first position
73Ua: Upper edge first position
73Lb: Lower edge second position
73Ub: Upper edge second position
74*a*: First representative position
74*b*: Second representative position
75L: Lower width direction representative position
75U: Upper width direction representative position
76: Virtual line
76L: Lower virtual line
76U: Upper virtual line
77La: Lower first virtual line
77Ua: Upper first virtual line
77Lb: Lower second virtual line
77Ub: Upper second virtual line
79: Reference measurement region
80: Flange surface indicated by reference three-dimensional shape data
81: Reference position indicated by reference three-dimensional shape data
82: Surface inclined with respect to flange surface indicated by reference three-dimensional shape data
83: Three-dimensional block
85: Point
86, 86*a*, 86*b*: Polygon (polygon plane)
87: Representative point
Ar: Axis
Dc: Circumferential direction
Dr: Radial direction
Dri: Radial inner side
Dro: Radial outer side
Dx: Lateral direction
Dy: Axial direction
Dz: Vertical direction
Dw: Flange width direction

The invention claimed is:

1. A method for estimating a flange displacement amount in a rotary machine, the rotary machine comprising:
- a rotor rotatable about an axis extending in a horizontal direction;
- a casing covering an outer periphery of the rotor;
- a stationary component disposed in the casing and attached to the casing; and
- a base frame supporting the casing from below, the casing including an upper-half casing on an upper side, a lower-half casing on a lower side, and a plurality of bolts fastening the upper-half casing to the lower-half casing, the upper-half casing including an upper flange formed with an upper flange surface facing downward, the lower-half casing including a lower flange formed with a lower flange surface facing upward and opposing the upper flange surface in a vertical direction and a first supported portion and a second supported portion continuous with the lower flange, supported by the base frame from below, and the first supported portion and the second supported portion being separated from each other in an axial direction in which the axis extends, the upper flange and the lower flange including bolt holes extending therethrough in the vertical direction, the respective plurality of bolts being insertable into the bolt holes, and an upper surface of the first supported portion and an upper surface of the second supported portion being shifted in the vertical direction with respect to the lower flange surface, the method comprising:
- receiving measured three-dimensional coordinate data at a plurality of positions on the upper flange surface and measured three-dimensional coordinate data at a plurality of positions on the lower flange surface, the measured three-dimensional coordinate data being measured after the rotary machine is disassembled and in an open state where the upper-half casing is not fastened to the lower-half casing by the plurality of bolts;
- determining effective three-dimensional coordinate data at a lower first position, a lower second position, and a lower target position by using the measured three-dimensional coordinate data at the plurality of positions on the lower flange surface, the lower first position being coincident with a first representative position to which a largest load is applied from the base frame in the first supported portion in a horizontal direction on a virtual plane continuous with the lower flange surface, the lower second position being coincident with a second representative position to which a largest load is applied from the base frame in the second supported portion in the horizontal direction on the virtual plane continuous with the lower flange surface, and the lower target position being a position on the lower flange surface from which a displacement amount in the vertical direction when a state changes from the open state to a fastened state where the upper-half casing is fastened to the lower-half casing by the plurality of bolts is to be obtained, and determining effective three-dimensional coordinate data at an upper first position, an upper second position, and an upper target position by using the measured three-dimensional coordinate data at the plurality of positions on the upper flange surface, the upper first position being coincident with the first representative position in the horizontal direction on a virtual plane continuous with the upper flange surface, the upper second position being coincident with the second representative position in the horizontal direction on the virtual plane continuous with the upper flange surface, and the upper target position being coincident with the lower target position in the horizontal direction on the upper flange surface;

changing the effective three-dimensional coordinate data determined during the determining of the effective three-dimensional coordinate data such that the effective three-dimensional coordinate data at the lower first position and the effective three-dimensional coordinate data at the upper first position determined during the determining of the effective three-dimensional coordinate data are coincident with each other and that the effective three-dimensional coordinate data at the lower second position and the effective three-dimensional coordinate data at the upper second position determined during the determining of the effective three-dimensional coordinate data are coincident with each other; and calculating a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after the changing of the effective three-dimensional coordinate data and a position in the vertical direction indicated by the effective three-dimensional coordinate data at the lower target position after the changing of the effective three-dimensional coordinate data, the determining of the effective three-dimensional coordinate data including:

determining effective three-dimensional coordinate data at a lower edge first position indicating a position of a boundary with the first supported portion on the lower flange surface, a lower edge second position indicating a position of a boundary with the second supported portion on the lower flange surface, and the lower target position by using the measured three-dimensional coordinate data at the plurality of positions on the lower flange surface and determining effective three-dimensional coordinate data at an upper edge first position, an upper edge second position, and the upper target position by using the measured three-dimensional coordinate data at the plurality of positions on the upper flange surface, the upper edge first position being coincident with the lower edge first position in the horizontal direction on the upper flange surface, the upper edge second position being coincident with the lower edge second position in the horizontal direction on the upper flange surface; and estimating effective three-dimensional coordinate data at the lower first position and the lower second position from a change tendency of effective three-dimensional coordinate data at the plurality of positions on the lower flange surface including the lower edge first position and the lower edge second position and estimating effective three-dimensional coordinate data at the upper first position and the upper second position from a change tendency of effective three-dimensional coordinate data at the plurality of positions on the upper flange surface including the upper edge first position and the upper edge second position.

2. The method for estimating a flange displacement amount in a rotary machine according to claim 1, wherein;

in the determining of the effective three-dimensional coordinate data, effective three-dimensional coordinate data at a lower width direction representative position which is a predetermined position in the axial direction and is a center position in a flange width direction on the lower flange surface is determined by using the measured three-dimensional coordinate data at the plurality of positions on the lower flange surface, and effective three-dimensional coordinate data at an upper width direction representative position which is coincident with the lower width direction representative position in the horizontal direction on the upper flange surface is determined by the measured three-dimensional coordinate data at the plurality of positions on the upper flange surface, and in the estimating of the effective three-dimensional coordinate data, effective three-dimensional coordinate data at the lower first position and the lower second position are estimated from a change tendency of the effective three-dimensional coordinate data at the lower edge first position, the lower edge second position, and the lower width direction representative position, and effective three-dimensional coordinate data at the upper first position and the upper second position are estimated from a change tendency of the effective three-dimensional coordinate data at the upper edge first position, the upper edge second position, and the upper width direction representative position.

3. The method for estimating a flange displacement amount in a rotary machine according to claim 1, wherein;

in the estimating of the effective three-dimensional coordinate data, effective three-dimensional coordinate data at the lower first position and the lower second position are estimated from a change tendency of the effective three-dimensional coordinate data at the lower edge first position, the lower edge second position, and the lower target position, and effective three-dimensional coordinate data at the upper first position and the upper second position are estimated from a change tendency of the effective three-dimensional coordinate data at the upper edge first position, the upper edge second position, and the upper target position.

4. The method for estimating a flange displacement amount in a rotary machine according to claim 1, wherein in the calculating of the displacement amount, one-half of the difference is used as the displacement amount of the upper target position and the displacement amount of the lower target position.

5. The method for estimating a flange displacement amount in a rotary machine according to claim 1, wherein the lower target position is a position at which the stationary component is disposed in the axial direction and is a position at an inner side edge on the lower flange surface.

6. The method for estimating a flange displacement amount in a rotary machine according to claim 1, wherein;

in the receiving of the measured three-dimensional coordinate data, measured three-dimensional coordinate data of the lower target position and the upper target position are received, and in the determining of the effective three-dimensional coordinate data, the measured three-dimensional coordinate data of the lower target position is determined to be effective three-dimensional coordinate data of the lower target position as is, and the measured three-dimensional coordinate data of the upper target position acquired in the measured coordinate receiving step is determined to be effective three-dimensional coordinate data of the upper target position as is.

7. The method for estimating a flange displacement amount in a rotary machine according to claim 1, wherein;

in the receiving of the measured three-dimensional coordinate data, measured three-dimensional coordinate data at a plurality of positions on a lower virtual line passing through the lower target position and extending in a flange width direction are received, and measured three-dimensional coordinate data at a plurality of positions on an upper virtual line passing through the upper target position and extending in the flange width direction are received, and in the determining of the effective three-dimensional coordinate data, effective three-dimensional coordinate data of the lower target position is obtained from the measured three-dimensional coordinate data at the plurality of positions on the lower virtual line, and effective three-dimensional coordinate data of the upper target position is obtained from the measured three-dimensional coordinate data at the plurality of positions on the upper virtual line.

8. The method for estimating a flange displacement amount in a rotary machine according to claim 1, wherein;

in the receiving of the measured three-dimensional coordinate data, measured three-dimensional coordinate data at a plurality of positions in a lower measurement region including the lower target position on the lower flange surface are received, and measured three-dimensional coordinate data at a plurality of positions in an upper measurement region including the upper target position on the upper flange surface are received, and in the determining of the effective three-dimensional coordinate data, effective three-dimensional coordinate data of the lower target position is obtained by using the measured three-dimensional coordinate data at the plurality of positions in the lower measurement region received in the measured coordinate receiving step, and effective three-dimensional coordinate data of the upper target position is obtained by using the measured three-dimensional coordinate data at the plurality of positions in the upper measurement region received in the measured coordinate receiving step.

9. The method for estimating a flange displacement amount in a rotary machine according to claim 1, wherein:

in the receiving of the measured three-dimensional coordinate data, measured three-dimensional coordinate data at a plurality of positions over an entirety of the lower flange surface is received, and measured three-dimensional coordinate data at a plurality of positions over an entirety of the upper flange surface is received, and in the determining of the effective three-dimensional coordinate data:

shape data of the lower flange surface indicating a three-dimensional shape of the entirety of the lower flange surface is obtained by using the measured three-dimensional coordinate data at the plurality of positions over the entirety of the lower flange surface received in the measured coordinate receiving step, and shape data of the upper flange surface indicating a three-dimensional shape of the entirety of the upper flange surface is obtained by using the measured three-dimensional coordinate data at the plurality of positions over the entirety of the upper flange surface received in the measured coordinate receiving step, and effective three-dimensional coordinate data of the lower target position is obtained by using the shape data of the lower flange surface, and effective three-dimensional coordinate data of the upper target position is obtained by using the shape data of the upper flange surface.

10. A non-transitory computer-readable storage medium storing a computer program for estimating a flange displacement amount in a rotary machine, the rotary machine comprising:

a rotor rotatable about an axis extending in a horizontal direction;

a casing covering an outer periphery of the rotor;

a stationary component disposed in the casing and attached to the casing; and a base frame supporting the casing from below, the casing including an upper-half casing on an upper side, a lower-half casing on a lower side, and a plurality of bolts fastening the upper-half casing to the lower-half casing, the upper-half casing including an upper flange formed with an upper flange surface facing downward, the lower-half casing including a lower flange formed with a lower flange surface facing upward and opposing the upper flange surface in a vertical direction and a first supported portion and a second supported portion continuous with the lower flange, supported by the base frame from below, and the first supported portion and the second supported portion being separated from each other in an axial direction in which the axis extends, the upper flange and the lower flange including bolt holes which extend therethrough in the vertical direction, the respective plurality of bolts being insertable into the bolt holes, and an upper surface of the first supported portion and an upper surface of the second supported portion being shifted in the vertical direction with respect to the lower flange surface, the program causing a computer to execute:

receiving of measured three-dimensional coordinate data at a plurality of positions on the upper flange surface and measured three-dimensional coordinate data at a plurality of positions on the lower flange surface, the measured three-dimensional coordinate data being measured after the rotary machine is disassembled and in an open state where the upper-half casing is not fastened to the lower-half casing by the plurality of bolts;

determining effective three-dimensional coordinate data at a lower first position, a lower second position, and a lower target position by using the measured three-dimensional coordinate data at the plurality of positions on the lower flange surface, the lower first position being coincident with a first representative position to which a largest load is applied from the base frame in the first supported portion in a horizontal direction on a virtual plane continuous with the lower flange surface, the lower second position being coincident with a second representative position to which a largest load is applied from the base frame in the second supported portion in the horizontal direction on the virtual plane continuous with the lower flange surface, and the lower target position being a position on the lower flange surface from which a displacement amount in the vertical direction when a state changes from the open state to a fastened state where the upper-half casing is fastened to the lower-half casing by the plurality of bolts is to be obtained, and determining effective three-dimensional coordinate data at an upper first position, an upper second position, and an upper target position by using the measured three-dimensional coordinate data at the plurality of positions on the upper flange surface, the upper first position being coincident with the first representative position in the horizontal direction on a virtual plane continuous with the upper flange surface, the upper second position being coincident with the second representative position in the horizontal direction on the virtual plane continuous with the upper flange surface, and the upper target position being coincident with the lower target position in the horizontal direction on the upper flange surface;

changing the effective three-dimensional coordinate data determined in the effective coordinate determining step such that the effective three-dimensional coordinate data at the lower first position and the effective three-dimensional coordinate data at the upper first position determined in the effective coordinate determining step are coincident with each other and that the effective three-dimensional coordinate data at the lower second position and the effective three-dimensional coordinate data at the upper second position determined in the determining of the effective three-dimensional coordinate data are coincident with each other; and calculating a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after the changing of the effective three-dimensional coordinate data and a position in the vertical direction indicated by the effective three-dimensional coordinate data at the lower target position after the changing of the effective three-dimensional coordinate data, the determining of the effective three-dimensional coordinate data including:

determining effective three-dimensional coordinate data at a lower edge first position indicating a position of a boundary with the first supported portion on the lower flange surface, a lower edge second position indicating a position of a boundary with the second supported portion on the lower flange surface, and the lower target position by using the measured three-dimensional coordinate data at the plurality of positions on the lower flange surface and determining effective three-dimensional coordinate data at an upper edge first position, an upper edge second position, and the upper target position by using the measured three-dimensional coordinate data at the plurality of positions on the upper flange surface, the upper edge first position being coincident with the lower edge first position in the horizontal direction on the upper flange surface, the upper edge second position being coincident with the lower edge second position in the horizontal direction on the upper flange surface; and estimating effective three-dimensional coordinate data at the lower first position and the lower second position from a change tendency of effective three-dimensional coordinate data at the plurality of positions on the lower flange surface including the lower edge first position and the lower edge second position and estimating effective three-dimensional coordinate data at the upper first position and the upper second position from a change tendency of effective three-dimensional coordinate data at the plurality of positions on the upper flange surface including the upper edge first position and the upper edge second position.

11. The non-transitory computer-readable storage medium storing the computer program for estimating a flange displacement amount in a rotary machine according to claim 10, wherein;

in the determining of the effective three-dimensional coordinate data, effective three-dimensional coordinate data at a lower width direction representative position which is a predetermined position in the axial direction and is a center position in a flange width direction on the lower flange surface is determined by using the measured three-dimensional coordinate data at the plurality of positions on the lower flange surface, and effective three-dimensional coordinate data at an upper width direction representative position which is coincident with the lower width direction representative position in the horizontal direction on the upper flange surface is determined by using the measured three-dimensional coordinate data at the plurality of positions on the upper flange surface, and in the estimating of the effective three-dimensional coordinate data, effective three-dimensional coordinate data at the lower first position and the lower second position are estimated from a change tendency of the effective three-dimensional coordinate data at the lower edge first position, the lower edge second position, and the lower width direction representative position, and effective three-dimensional coordinate data at the upper first position and the upper second position are estimated from a change tendency of the effective three-dimensional coordinate data at the upper edge first position, the upper edge second position, and the upper width direction representative position.

12. The non-transitory computer-readable storage medium storing the computer program for estimating a flange displacement amount in a rotary machine according to claim 10, wherein;

in the estimating of the effective three-dimensional coordinate data, effective three-dimensional coordinate data at the lower first position and the lower second position are estimated from a change tendency of the effective three-dimensional coordinate data at the lower edge first position, the lower edge second position, and the lower target position, and effective three-dimensional coordinate data at the upper first position and the upper second position are estimated from a change tendency of the effective three-dimensional coordinate data at the upper edge first position, the upper edge second position, and the upper target position.

13. The non-transitory computer-readable storage medium storing the computer program for estimating a flange displacement amount in a rotary machine according to claim 10, wherein, in the calculating of the displacement amount, one-half of the difference is used as the displacement amount of the upper target position and the displacement amount of the lower target position.

14. A device for estimating a flange displacement amount in a rotary machine, the rotary machine comprising:

a rotor rotatable about an axis extending in a horizontal direction;

a casing covering an outer periphery of the rotor;

a stationary component disposed in the casing and attached to the casing; and a base frame supporting the casing from below, the casing including an upper-half casing on an upper side, a lower-half casing on a lower side, and a plurality of bolts fastening the upper-half casing to the lower-half casing, the upper-half casing including an upper flange formed with an upper flange surface facing downward, the lower-half casing including a lower flange formed with a lower flange surface facing upward and opposing the upper flange surface in a vertical direction and a first supported portion and a second supported portion continuous with the lower flange, supported by the base frame from below, and the first supported portion and the second supported portion being separated from each other in an axial direction in which the axis extends, the upper flange and the lower flange including bolt holes which extend therethrough in the vertical direction, the respective plurality of bolts being insertable into the bolt holes, and an upper surface of the first supported portion and an upper surface of the second supported portion being shifted in the vertical direction with respect to the lower flange surface, the device comprising:

a measured coordinate receiving unit configured to receive measured three-dimensional coordinate data at a plurality of positions on the upper flange surface and measured three-dimensional coordinate data at a plurality of positions on the lower flange surface, the measured three-dimensional coordinate data being measured after the rotary machine is disassembled in an open state where the upper-half casing is not fastened to the lower-half casing by the plurality of bolts;

an effective coordinate determining unit configured to determine effective three-dimensional coordinate data at a lower first position, a lower second position, and a lower target position by using the measured three-dimensional coordinate data at the plurality of positions on the lower flange surface, the lower first position being coincident with a first representative position to which a largest load is applied from the base frame in the first supported portion in a horizontal direction on a virtual plane continuous with the lower flange surface, the lower second position being coincident with a second representative position to which a largest load is applied from the base frame in the second supported portion in the horizontal direction on the virtual plane continuous with the lower flange surface, and the lower target position being a position on the lower flange surface from which a displacement amount in the vertical direction when a state changes from the open state to a fastened state where the upper-half casing is fastened to the lower-half casing by the plurality of bolts is to be obtained, and determine effective three-dimensional coordinate data at an upper first position, an upper second position, and an upper target position by using the measured three-dimensional coordinate data at the plurality of positions on the upper flange surface, the upper first position being coincident with the first representative position in the horizontal direction on a virtual plane continuous with the upper flange surface, the upper second position being coincident with the second representative position in the horizontal direction on the virtual plane continuous with the upper flange surface, and the upper target position being coincident with the lower target position in the horizontal direction on the upper flange surface;

a coordinate change unit configured to change the effective three-dimensional coordinate data determined by the effective coordinate determining unit such that the effective three-dimensional coordinate data at the lower first position and the effective three-dimensional coordinate data at the upper first position determined by the effective coordinate determining unit are coincident with each other and that the effective three-dimensional coordinate data at the lower second position and the effective three-dimensional coordinate data at the upper second position determined by the effective coordinate determining unit are coincident with each other; and a displacement amount calculation unit configured to calculate a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after a coordinate change and a position in the vertical direction indicated by the effective three-dimensional coordinate data at the lower target position after the coordinate change, the effective coordinate determining unit including:

a first processing unit configured to determine effective three-dimensional coordinate data at a lower edge first position indicating a position of a boundary with the first supported portion on the lower flange surface, a lower edge second position indicating a position of a boundary with the second supported portion on the lower flange surface, and the lower target position by using the measured three-dimensional coordinate data at the plurality of positions on the lower flange surface and determine effective three-dimensional coordinate data at an upper edge first position, an upper edge second position, and the upper target position by using the measured three-dimensional coordinate data at the plurality of positions on the upper flange surface, the upper edge first position being coincident with the lower edge first position in the horizontal direction on the upper flange surface, the upper edge second position being coincident with the lower edge second position in the horizontal direction on the upper flange surface; and a second processing unit configured to estimate effective three-dimensional coordinate data at the lower first position and the lower second position from a change tendency of effective three-dimensional coordinate data at the plurality of positions on the lower flange surface including the lower edge first position and the lower edge second position and estimate effective three-dimensional coordinate data at the upper first position and the upper second position from a change tendency of effective three-dimensional coordinate data at the plurality of positions on the upper flange surface including the upper edge first position and the upper edge second position.

15. The device for estimating a flange displacement amount in a rotary machine according to claim 14, wherein;

the first processing unit is configured to determine effective three-dimensional coordinate data at a lower width direction representative position which is a predetermined position in the axial direction and is a center position in a flange width direction on the lower flange surface by using the measured three-dimensional coordinate data at the plurality of positions on the lower flange surface, and to determine effective three-dimensional coordinate data at an upper width direction representative position which is coincident with the lower width direction representative position in the horizontal direction on the upper flange surface by using the measured three-dimensional coordinate data at the plurality of positions on the upper flange surface, and the second processing unit is configured to estimate effective three-dimensional coordinate data at the lower first position and the lower second position from a change tendency of the effective three-dimensional coordinate data at the lower edge first position, the lower edge second position, and the lower width direction representative position, and to estimate effective three-dimensional coordinate data at the upper first position and the upper second position from a change tendency of the effective three-dimensional coordinate data at the upper edge first position, the upper edge second position, and the upper width direction representative position.

16. The device for estimating a flange displacement amount in a rotary machine according to claim 14, wherein the second processing unit estimates effective three-dimensional coordinate data at the lower first position and the lower second position from a change tendency of the effective three-dimensional coordinate data at the lower edge first position, the lower edge second position, and the lower target position and estimates effective three-dimensional coordinate data at the upper first position and the upper second position from a change tendency of the effective three-dimensional coordinate data at the upper edge first position, the upper edge second position, and the upper target position.

17. The device for estimating a flange displacement amount in a rotary machine according to claim 14, wherein the displacement amount calculation unit uses one-half of the difference as the displacement amount of the upper target position and the displacement amount of the lower target position.

* * * * *